US011397102B2

(12) United States Patent
Yamamoto et al.

(10) Patent No.: US 11,397,102 B2
(45) Date of Patent: Jul. 26, 2022

(54) PHYSICAL QUANTITY DETECTING DEVICE

(71) Applicant: HITACHI AUTOMOTIVE SYSTEMS, LTD., Hitachinaka (JP)

(72) Inventors: Takahiro Yamamoto, Hitachinaka (JP); Tsutomu Kono, Hitachinaka (JP); Takahiro Miki, Hitachinaka (JP); Yuki Isoya, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 17/057,811

(22) PCT Filed: Feb. 13, 2019

(86) PCT No.: PCT/JP2019/005051
§ 371 (c)(1),
(2) Date: Nov. 23, 2020

(87) PCT Pub. No.: WO2019/225072
PCT Pub. Date: Nov. 28, 2019

(65) Prior Publication Data
US 2021/0302211 A1   Sep. 30, 2021

(30) Foreign Application Priority Data
May 24, 2018   (JP) .............................. JP2018-099471

(51) Int. Cl.
*G01F 1/696*   (2006.01)
(52) U.S. Cl.
CPC .................................. *G01F 1/6965* (2013.01)

(58) Field of Classification Search
None
See application file for complete search history.

(56) References Cited

U.S. PATENT DOCUMENTS

| 2005/0126183 A1 | 6/2005 | Nakamura |
| 2008/0092645 A1 | 4/2008 | Kanke |
| 2010/0049461 A1 | 2/2010 | Lull |

(Continued)

FOREIGN PATENT DOCUMENTS

| JP | H06-10752 A | 1/1994 | |
| JP | 3304844 B2 * | 7/2002 | ......... F02D 41/1402 |

(Continued)

OTHER PUBLICATIONS

International Search Report with English translation and Written Opinion issued in corresponding application No. PCT/JP2019/005051 dated Apr. 2, 2019.

*Primary Examiner* — Matthew G Marini
(74) *Attorney, Agent, or Firm* — Foley & Lardner LLP

(57) ABSTRACT

It is possible to suppress overcorrection.
A physical quantity detecting device includes: a physical quantity detecting sensor that detects a physical quantity of a measurement target fluid and outputs a detection signal; a compensation amount calculation unit that calculates, by using the detection signal, a lead compensation amount used in lead compensation for the detection signal; and a gain control unit that adjusts the lead compensation amount based on a deviation that is an amount of change in lead compensation amount over time.

11 Claims, 18 Drawing Sheets

(56) References Cited

U.S. PATENT DOCUMENTS

2010/0088044 A1* 4/2010 Vogel .................. G01F 1/6842
                                                            702/45
2010/0275685 A1   11/2010 Hanzawa
2012/0192632 A1    8/2012 Matsumoto
2016/0273949 A1    9/2016 Kawai

FOREIGN PATENT DOCUMENTS

| JP | 2005-36691 A | 2/2005 | |
|---|---|---|---|
| JP | 2010-261750 A | 11/2010 | |
| JP | 2012-159314 A | 8/2012 | |
| JP | 2016-109625 A | 6/2016 | |
| JP | 2016-170135 A | 9/2016 | |
| KR | 900004250 B1 * | 6/1990 | ............. G05B 13/04 |
| WO | WO-2006/051589 A1 | 5/2006 | |

* cited by examiner

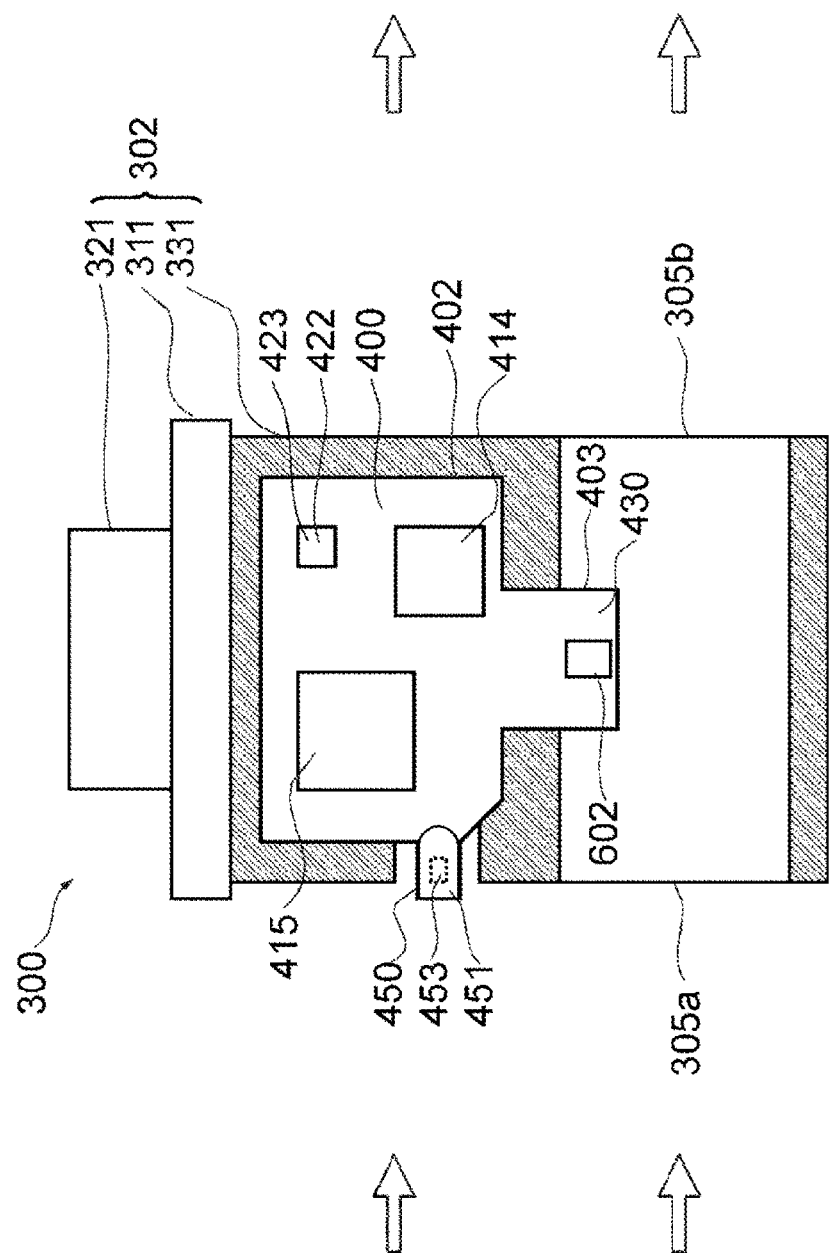

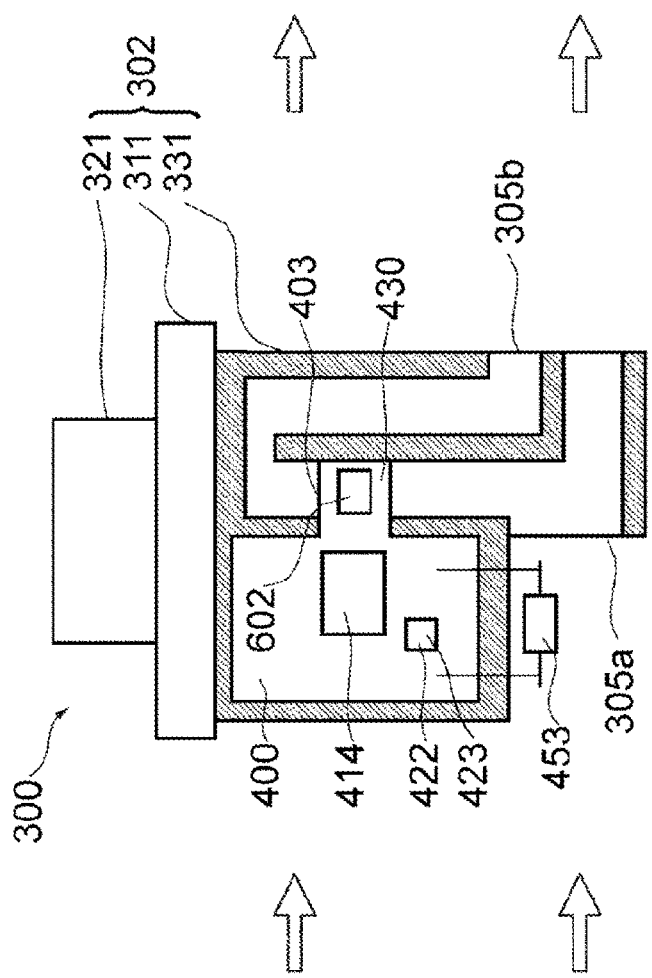

FIG. 10

| | DETERMINATION RESULT | | STATE SELECTION |
|---|---|---|---|
| | LPF DELAY DETERMINATION | RESPONSE COMPENSATION AMOUNT DETERMINATION | |
| CASE 1 | True | True | RESPONSE(TA_SelSw=1) |
| CASE 2 | True | False | KEEP PRECEDING STATE |
| CASE 3 | False | True | |
| CASE 4 | False | False | STEADY(TA_SelSw=0) |

PHYSICAL QUANTITY DETECTING DEVICE

TECHNICAL FIELD

The present invention relates to a physical quantity detecting device.

BACKGROUND ART

In order to control a vehicle, it is necessary to measure various physical quantities with high accuracy.

However, in a vehicle, it is difficult to measure physical quantities such as heat and noise with high accuracy, which is problematic. PTL 1 discloses an intake air temperature sensor including a secondary passage having an opening for taking in a part of an intake airflow, a flow rate detecting element provided in the secondary passage, an electronic circuit electrically connected to the flow rate detecting element, and a circuit mounting board mounted with the electronic circuit, and further including a casing storing at least a part of the circuit mounting board, the intake air temperature sensor including: an intake air temperature detecting element provided outside the secondary passage; a temperature sensor detecting a temperature around a fitting section of the intake air temperature detecting element; and means for correcting an output of the intake air temperature detecting element on the basis of an output of the temperature sensor and an output of the flow rate detecting element.

CITATION LIST

Patent Literature

PTL 1: JP 2012-159314 A

SUMMARY OF INVENTION

Technical Problem

In the configuration disclosed in PTL 1, it is required to include a plurality of sensors, which poses a problem such as an increase in device size and costs. Lead compensation can be considered as correction using a single sensor. However, there may be a problem that overcorrection occurs when a signal suddenly changes due to an influence of an ambient environment or EMC noise.

Solution to Problem

A physical quantity detecting device according to a first aspect of the present invention includes: a physical quantity detecting sensor that detects a physical quantity of a measurement target fluid and outputs a detection signal; a compensation amount calculation unit that calculates, by using the detection signal, a lead compensation amount used in lead compensation for the detection signal; and a gain control unit that adjusts the lead compensation amount based on a deviation that is an amount of change in lead compensation amount over time.

Advantageous Effects of Invention

According to the present invention, overcorrection can be suppressed.

BRIEF DESCRIPTION OF DRAWINGS

FIG. 2-1 is a cross-sectional view of a physical quantity detecting device 300.

FIG. 2-2 is a cross-sectional view of the physical quantity detecting device 300 having a different configuration.

FIG. 6-1 is a diagram illustrating time-series changes of a pre-correction temperature TAin and a post-correction temperature TAout during thermal response of intake air.

FIG. 6-2 is a diagram illustrating time-series changes of a pre-correction temperature TAin and a post-correction temperature TAout during occurrence of an external disturbance.

FIG. 6-3 is a diagram illustrating time-series changes of a pre-correction temperature TAin and a post-correction temperature TAout when the temperature of a measurement target fluid 30 changes gradually and continuously.

FIG. 6-4 is a diagram illustrating a problem of an output shift in a pre-correction temperature TAin and a post-correction temperature TAout.

FIG. 8-1 is a diagram illustrating an input and an output of an LPF delay determination unit 751 at the start of thermal response.

FIG. 8-2 is a diagram illustrating a difference between the input and the output in FIG. 8-1.

FIG. 10 is a diagram illustrating filter selection performed by a state selection unit 753.

FIG. 12-1 is a diagram illustrating an example of an input/output relationship of a first gain coefficient calculation unit 756.

FIG. 12-2 is a diagram illustrating an example of an input/output relationship of a second gain coefficient calculation unit 757.

DESCRIPTION OF EMBODIMENTS

Embodiments

Embodiments of a physical quantity detecting device according to the present invention will be described below with reference to FIGS. 1 to 12-2. Embodiments described below solve various problems that are desired as actual products, and particularly, solve various problems required for use as a detecting device which detects a physical quantity of intake air in a vehicle, and consequently, various effects are obtained. One of various problems to be solved by the embodiments described below is the content described in Technical Problem described above, and one of various effects obtained in the embodiments described below is the effects described in Advantageous Effects of Invention. Various problems to be solved by the embodiments described below and various effects achieved by the embodiments described below will be described in the description of the embodiments. Therefore, the problems to be solved the embodiments and the effects described in the embodiments are also described in contents other than the contents of Technical Problem and Advantageous Effects of Invention.

1. Internal Combustion Engine Control System S

Figure 1:
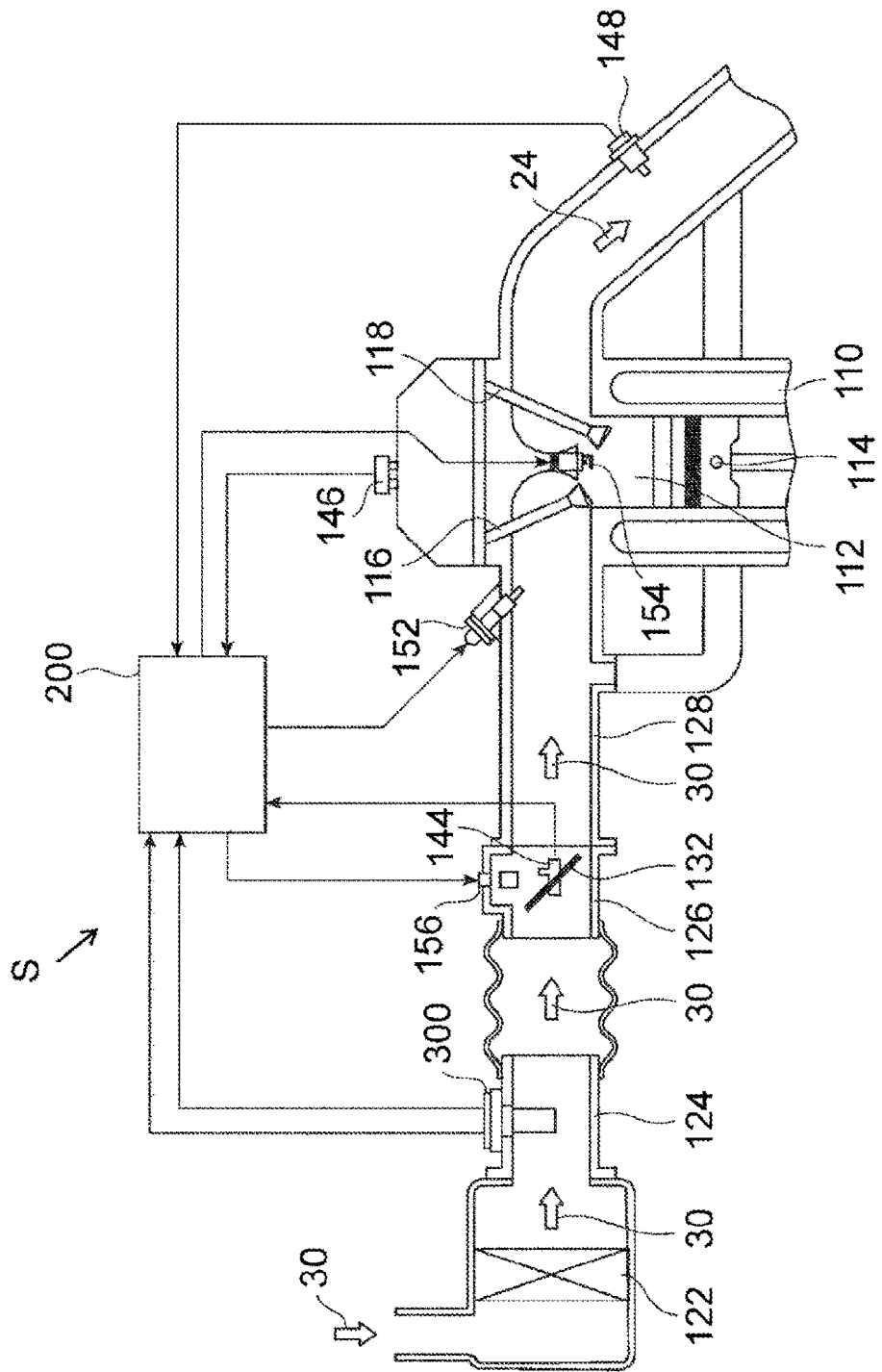
FIG. 1 is a configuration diagram of an internal combustion engine control system S.

FIG. 1 is a configuration diagram of an electronic fuel injection type internal combustion engine control system S including a physical quantity detecting device 300 according to the present invention. In the internal combustion engine control system S, intake air that is a measurement target fluid 30 moves as follows based on an operation of an internal combustion engine 110 including an engine cylinder 112 and an engine piston 114. That is, the measurement target fluid 30 is first sucked from an air cleaner 122 and guided to a combustion chamber of the engine cylinder 112 via a main passage 124 such as an intake body, a throttle body 126, and an intake manifold 128.

The physical quantity of the measurement target fluid 30 is detected by the physical quantity detecting device 300. A fuel injection valve 152 supplies fuel based on the physical quantity detected by the physical quantity detecting device 300. The fuel supplied by the fuel injection valve 152 is guided to the combustion chamber in a mixed gas state together with the intake air, and is combusted to generate mechanical energy. The fuel injection valve 152 is provided in, for example, an intake port of the internal combustion engine, and fuel injected into the intake port forms mixed gas with the measurement target fluid 30 which is intake air, and is guided to the combustion chamber through an intake valve 116.

The fuel and air guided to the combustion chamber are in a fuel-air mixture state, and are explosively combusted by spark ignition of a spark plug 154, thereby generating mechanical energy. The gas after combustion is guided to an exhaust pipe from an exhaust valve 118, and is exhausted as exhaust gas 24 from the exhaust pipe to the outside of the vehicle. The flow rate of the measurement target fluid 30, which is the intake air guided to the combustion chamber, is controlled by a throttle valve 132 whose opening degree changes based on an operation of an accelerator pedal. A fuel supply amount is controlled based on the flow rate of the intake air guided to the combustion chamber. A driver can control the opening degree of the throttle valve 132 to control the flow rate of the intake air guided to the combustion chamber, thereby controlling the mechanical energy generated by the internal combustion engine.

1.1 Overview of Control of Internal Combustion Engine Control System S

The physical quantity detecting device 300 detects a physical quantity such as a flow rate, a temperature, a humidity, or a pressure of the measurement target fluid 30, which is intake air introduced from the air cleaner 122 and flowing through the main passage 124. An electric signal representing the physical quantity of the intake air is input from the physical quantity detecting device 300 to a control device 200. An output of a throttle angle sensor 144 that measures the opening degree of the throttle valve 132 is input to the control device 200. The positions or states of the engine piston 114 of the internal combustion engine, the intake valve 116, and the exhaust valve 118 are input to the control device 200. Further, the output of the rotation angle sensor 146 is input to the control device 200 in order to measure a rotation speed of the internal combustion engine. An output of an oxygen sensor 148 is input to the control device 200 in order to measure a state of a mixing ratio of a fuel amount and an air amount based on a state of the exhaust gas 24.

The control device 200 calculates a fuel injection amount and an ignition timing based on the physical quantity of the intake air, which is the output of the physical quantity detecting device 300, and the rotation speed of the internal combustion engine measured based on the output of the rotation angle sensor 146. Based on results of the calculation, the amount of fuel supplied from the fuel injection valve 152 and the ignition timing at which ignition is made by the spark plug 154 are controlled. In actual implementation, the fuel supply amount and the ignition timing are finely controlled based further on a change state of the temperature detected by the physical quantity detecting device 300 or the throttle angle, a change state of the engine rotation speed, and a state of an air-fuel ratio measured by the oxygen sensor 148. In addition, the control device 200 controls the rotation speed of the internal combustion engine in an idle operation state by controlling an amount of air bypassing the throttle valve 132 with an idle air control valve 156 in the idle operation state of the internal combustion engine.

1.2 Importance of Improving Detection Accuracy of Physical Quantity Detecting Device 300 and Installation Environment of Physical Quantity Detecting Device 300

Both of the fuel supply amount and the ignition timing, which are main control amounts of the internal combustion engine, are calculated using the output of the physical quantity detecting device 300 as a main parameter. Therefore, it is important to improve the detection accuracy of the physical quantity detecting device 300, suppress a change over time, and improve reliability in terms of improving vehicle control accuracy or ensuring the reliability.

Particularly, in recent years, there are a great demand for fuel efficiency of a vehicle, and a great demand for exhaust gas purification. To meet these demands, it is extremely important to improve the accuracy in detecting the physical quantity of the intake air, the physical quantity being detected by the physical quantity detecting device 300. It is also important that the physical quantity detecting device 300 maintains high reliability.

The vehicle in which the physical quantity detecting device 300 is installed is used in an environment in which a change in temperature or humidity is large. It is desirable that the physical quantity detecting device 300 can cope with a change in temperature and humidity in the use environment, and dust or contaminants. In addition, the physical quantity detecting device 300 is attached to an intake pipe that is affected by heat generated by the internal combustion engine. Therefore, the heat generated by the internal combustion engine is transferred to the physical quantity detecting device 300 via the intake pipe that is the main passage 124. Since the physical quantity detecting device 300 detects the flow rate of the measurement target fluid 30 by performing heat transfer with the measurement target fluid 30, it is important to suppress the influence of heat from the outside as much as possible.

2. Configuration of Physical Quantity Detecting Device 300

2.1 External Structure of Physical Quantity Detecting Device 300

Figures 1, 6:
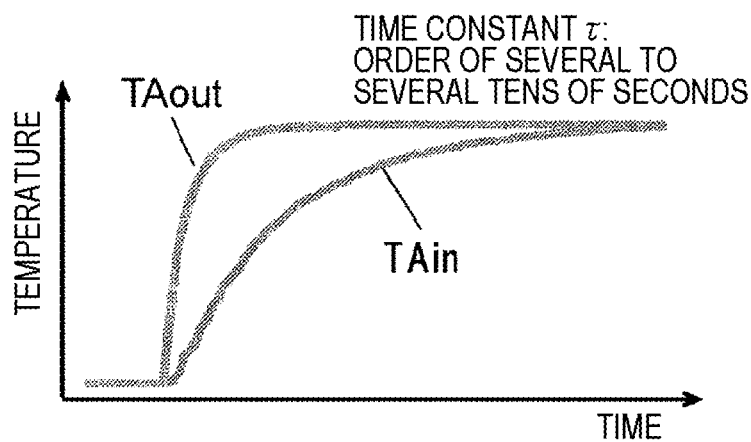
Figures 2, 6:
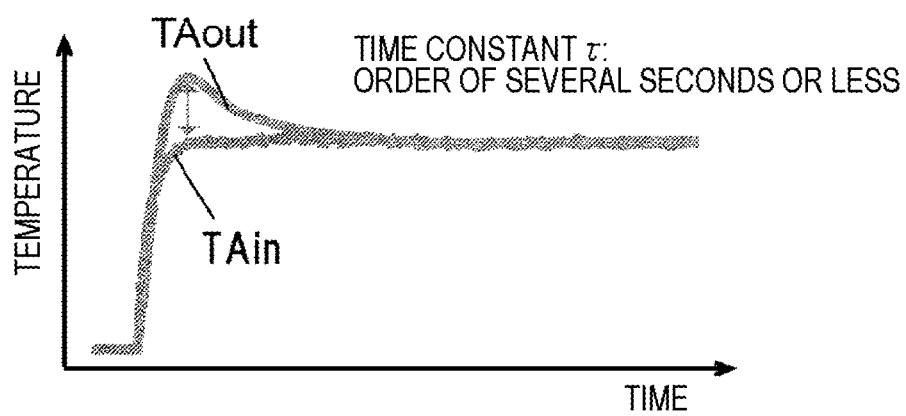
Figures 3, 6:
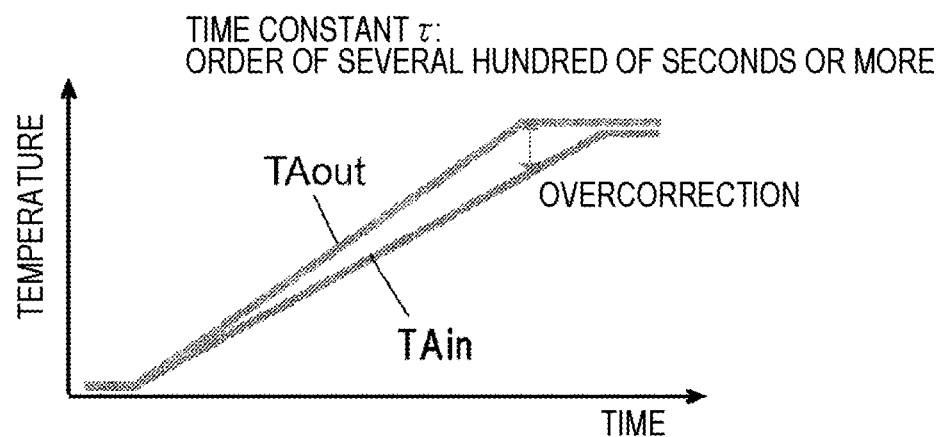
Figures 4, 6:
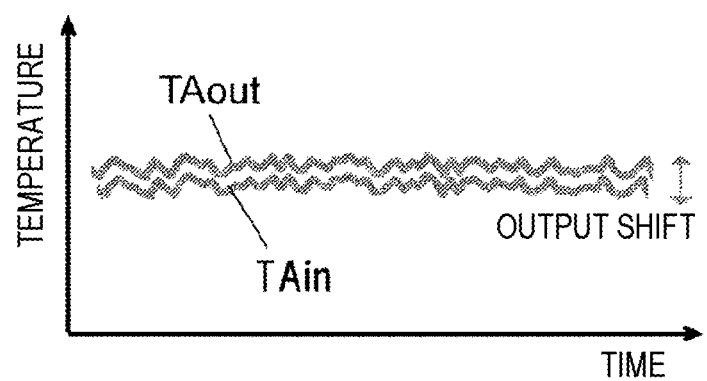

FIG. 2-1 is a cross-sectional view of the physical quantity detecting device 300. The physical quantity detecting device 300 includes a housing 302. The housing 302 is formed by molding a synthetic resin material. The housing 302 includes a flange 311 for fixing the physical quantity detecting device 300 to the intake body which is the main passage 124, an external connection portion 321 including a connector protruding from the flange 311 and configured for electrical connection with an external device, and a measurement portion 331 extending so as to protrude from the flange 311 toward the center of the main passage 124.

In the measurement portion 331, a circuit board 400 is provided. In the circuit board 400, at least one detection portion for detecting the physical quantity of the measurement target fluid 30 flowing through the main passage 124, and a circuit portion for processing a signal detected by the detection portion. The detection portion is arranged at a position exposed to the measurement target fluid 30, and the circuit portion is arranged in a closed circuit chamber. Various materials can be used as the material of the circuit board 400. For example, a material formed of a glass epoxy resin is preferable because it is inexpensive and easy to process.

A first sub-passage 305 is formed in the measurement portion 331. A first sub-passage inlet 305a for incorporating a part of the measurement target fluid 30 such as intake air into the first sub-passage 305 and a first sub-passage outlet 305b for returning the measurement target fluid 30 from the first sub-passage 305 to the main passage 124 are provided at end portions of the measurement portion 331, respectively. A portion of the circuit board 400 protrudes in the middle of the first sub-passage 305, and a flow rate detection portion 602 as a detection portion is arranged in the protruding portion to detect the flow rate of the measurement target fluid 30.

The external connection portion 321 is provided on an upper surface of the flange 311 and includes the connector. The connector is provided with an insertion hole for inserting a communication cable for connection with the control device 200. An external terminal is provided in the insertion hole. The external terminal serves as a terminal for outputting information on a physical quantity that is a measurement result of the physical quantity detecting device 300 and a power supply terminal for supplying direct current (DC) power for operating the physical quantity detecting device 300.

2.2 Effects Based on External Structure of Physical Quantity Detecting Device 300

In the physical quantity detecting device 300, a protruding portion 403 is provided at a middle portion of the measurement portion 331 extending from the flange 311 toward the center of the main passage 124, and the first sub-passage inlet 305a is provided at the end portion of the measurement portion 331. Therefore, gas in the vicinity of a central portion of the main passage that is away from an inner wall surface of the main passage 124, not in the vicinity of the inner wall surface, can be introduced into each of the protruding portion 403 and the first sub-passage 305. Therefore, the physical quantity detecting device 300 can measure the physical quantity of the gas in a portion of the main passage 124 that is away from the inner wall surface, and can reduce a physical quantity measurement error caused by heat and a decrease in flow velocity near the inner wall surface.

2.3 Appearance of Circuit Board 400

The circuit portion is configured mounting electronic components such as a microcomputer 415, a power supply regulator 416, an on-board temperature sensor 423, and a chip component 417 such as a resistor or capacitor on a circuit wiring (not illustrated).

The protruding portion 403 is arranged in the first sub-passage 305, and the measurement flow channel surface 430, which is a surface of the protruding portion 403, extends along a flow direction of the measurement target fluid 30. The flow rate detection portion 602 is provided on the measurement flow channel surface 430 of the protruding portion 403.

The flow rate detection portion 602 performs heat transfer with the measurement target fluid 30, measures a state of the measurement target fluid 30, for example, the flow velocity of the measurement target fluid 30, and outputs an electric signal indicating the flow rate in the main passage 124.

2.4 Structure of Temperature Detection Portion 451

A temperature detection portion 451 is provided at a portion corresponding to an upstream side edge and a corner of a base portion 402, the corner being adjacent to the protruding portion 403. The temperature detection portion 451 configures one of the detection portions for detecting the physical quantity of the measurement target fluid 30 flowing through the main passage 124, and is provided on the circuit board 400. The circuit board 400 has a protruding portion 450 that protrudes toward an upstream side of the measurement target fluid 30, and the temperature detection portion 451 includes a chip-type temperature sensor 453 provided on a portion corresponding to the protruding portion 450 and a back surface of the circuit board 400. A temperature sensor 453 and a wiring portion thereof are covered with a synthetic resin material to prevent electrolytic corrosion due to adhesion of salt water.

FIG. 2-2 is an appearance view illustrating a different configuration of the physical quantity detecting device 300. In the configuration illustrated in FIG. 2-1, the physical quantity detecting device 300 includes the temperature sensor 453, and the temperature sensor 453 is a chip type. However, the configuration of the physical quantity detecting device 300 is not limited to the configuration illustrated in FIG. 2-1, and for example, an axial type may be used as illustrated in FIG. 2-2 or another configuration may be used.

3. Circuit Configuration of Physical Quantity Detecting Device 300

3.1 Overall Circuit Configuration of Physical Quantity Detecting Device 300

Figure 3:
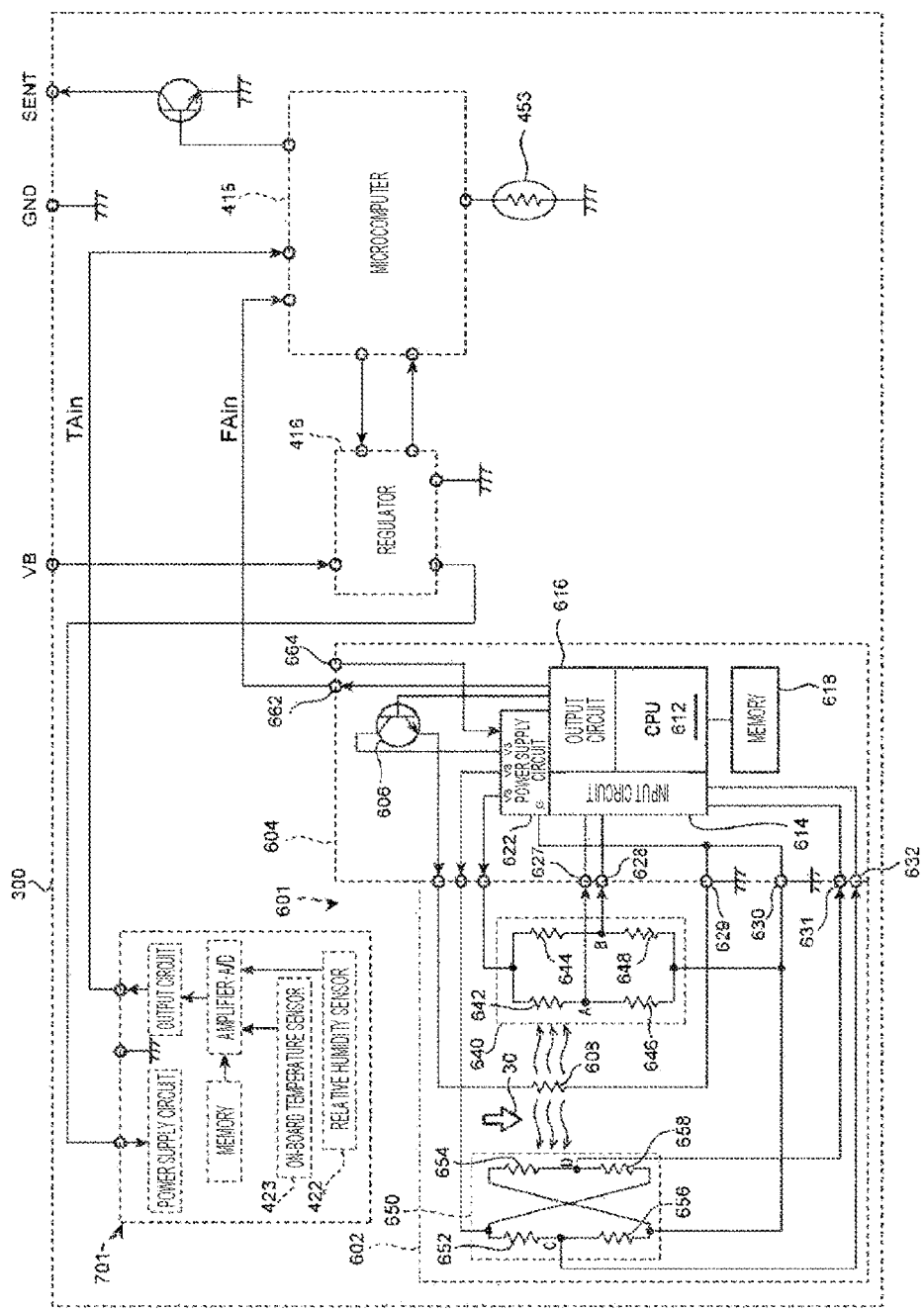
FIG. 3 is a circuit diagram of the physical quantity detecting device 300.

FIG. 3 is a circuit diagram of the physical quantity detecting device 300. The physical quantity detecting device 300 includes a flow rate detection circuit 601, a temperature/humidity detection circuit 701, the microcomputer 415, and the power supply regulator 416.

The flow rate detection circuit 601 includes a flow rate detection portion 602 including a heating element 608, and a processing unit 604. The processing unit 604 controls a heat generation amount of the heating element 608 of the flow rate detection portion 602, and outputs, to the microcomputer 415 via a terminal 662, a signal indicating the flow rate based on an output of the flow rate detection portion 602. In order to perform this processing, the processing unit 604 includes a CPU 612 which is a central processing unit, an input circuit 614, an output circuit 616, a memory 618 which stores data indicating a correction value or a relationship between a measurement value and a flow rate, and a power supply circuit 622 which supplies a certain voltage to each of necessary circuits. DC power is supplied to the power supply circuit 622 from an external power supply such as an in-vehicle battery via a terminal 664 and a ground terminal (not illustrated).

The heating element 608 for heating the measurement target fluid 30 is provided in the flow rate detection portion 602. A voltage V1 is supplied from the power supply circuit 622 to a collector of a transistor 606 that configures a current supply circuit of the heating element 608. A control signal is applied from the CPU 612 to a base of the transistor 606 via the output circuit 616. Based on this control signal, a current is supplied from the transistor 606 to the heating element 608 via a terminal 624. The amount of the current supplied to the heating element 608 is controlled by the control signal applied from the CPU 612 to the transistor 606 via the output circuit 616. Note that the transistor 606 configures the current supply circuit of the heating element 608. The processing unit 604 controls the heat generation amount of the heating element 608 so that the temperature of the measurement target fluid 30 becomes higher than an initial temperature by a predetermined temperature, for example, 100° C., due to heating by the heating element 608.

The flow rate detection portion 602 includes a heat generation control bridge 640 for controlling the heat generation amount of the heating element 608 and a flow rate detection bridge 650 for measuring the flow rate. A certain voltage V3 is supplied from the power supply circuit 622 to one end of the heat generation control bridge 640 via a terminal 626, and the other end of the heat generation control bridge 640 is connected to a ground terminal 630. Further, a certain voltage V2 is supplied from the power supply circuit 622 to one end of the flow rate detection bridge 650 via a terminal 625, and the other end of the flow rate detection bridge 650 is connected to the ground terminal 630.

The heat generation control bridge 640 includes a resistor 642 which is a temperature measuring resistor whose resistance value changes based on the temperature of the heated measurement target fluid 30. The resistor 642, a resistor 644, a resistor 646, and a resistor 648 form a bridge circuit. A potential difference between an intersection A between the resistors 642 and 646 and an intersection B between the resistors 644 and 648 is input to the input circuit 614 via terminals 627 and 628. The CPU 612 controls the heat generation amount of the heating element 608 by controlling a current supplied from the transistor 606 so that the potential difference between the intersection A and the intersection B becomes a predetermined value, for example, zero volts.

The flow rate detection circuit 601 illustrated in FIG. 3 heats the measurement target fluid 30 with the heating element 608 so that the temperature of the measurement target fluid 30 becomes higher than the original temperature by a predetermined temperature, for example, 100° C. In order to perform the heating control with high accuracy, a resistance value of each resistor included in the heat generation control bridge 640 is set as follows. That is, the resistance value of each resistor is set so that the potential difference between the intersection A and the intersection B becomes zero volts each time the temperature of the measurement target fluid 30 heated by the heating element 608 becomes higher than the initial temperature by a predetermined temperature, for example, 100° C. Therefore, the CPU 612 of the flow rate detection circuit 601 controls a current to be supplied to the heating element 608 so that the potential difference between the intersection A and the intersection B becomes zero volts.

The flow rate detection bridge 650 includes four temperature measuring resistors including a resistor 652, a resistor 654, a resistor 656, and a resistor 658. These four temperature measuring resistors are arranged along the flow of the measurement target fluid 30. The resistors 652 and 654 are arranged upstream of a flow channel of the measurement target fluid 30 with respect to the heating element 608. The resistors 656 and 658 are arranged downstream of the flow channel of the measurement target fluid 30 with respect to the heating element 608. Further, in order to improve measurement accuracy, the resistors 652 and 654 are arranged so that distances to the heating element 608 are substantially the same. Similarly, the resistors 656 and 658 are arranged so that distances to the heating element 608 are substantially the same.

A potential difference between an intersection C between the resistors 652 and 656 and an intersection D between the resistors 654 and 658 is input to the input circuit 614 through terminals 631 and 632. In order to improve the measurement accuracy, each resistor of the flow rate detection bridge 650 is set so that the potential difference between the intersection C and the intersection D becomes zero in a state in which the flow of the measurement target fluid 30 is zero, for example. Therefore, in a state in which the potential difference between the intersection C and the intersection D is, for example, zero volts, the CPU 612 outputs, via the terminal 662, an electric signal indicating that the flow rate in the main passage 124 is zero based on a measurement result that the flow rate of the measurement target fluid 30 is zero.

In a case where the measurement target fluid 30 flows in an arrow direction in FIG. 3, that is, in a case where the measurement target fluid 30 flows from top to bottom in FIG. 3, the operation of the flow rate detection bridge 650 is as follows. The resistors 652 and 654 arranged on the upstream side are cooled by the measurement target fluid 30. The resistors 656 and 658 arranged on the downstream side of the measurement target fluid 30 are heated by the measurement target fluid 30 warmed by the heating element 608, and thus the temperatures of the resistors 656 and 658 increase.

Therefore, a potential difference is generated between the intersection C and the intersection D of the flow rate detection bridge 650, and the potential difference is input to the input circuit 614 via the terminals 631 and 632. The CPU 612 retrieves data indicating the relationship between the above-mentioned potential difference and the flow rate in the main passage 124 and stored in the memory 618, based on the potential difference between the intersection C and the intersection D of the flow rate detection bridge 650, and calculates the flow rate in the main passage 124. An electric signal representing the flow rate in the main passage 124 calculated as described above is output via the terminal 662.

The memory 618 stores data indicating the relationship between the potential difference between the intersection C and the intersection D and the flow rate in the main passage 124. The memory 618 further stores correction data for reducing a measurement error such as a variation, the correction data being obtained based on an actual measurement value of the gas after the production of the circuit board 400.

The temperature/humidity detection circuit 701 includes an input circuit such as an amplifier or A/D converter to which a detection signal is input from each of the on-board temperature sensor 423 and a humidity sensor 422, an output circuit, a memory that stores data indicating a correction value or a relationship between a temperature and an absolute humidity, and the power supply circuit 622 that supplies a certain voltage to each of necessary circuits. The signal output from each of the flow rate detection circuit 601 and the temperature/humidity detection circuit 701 is input to the microcomputer 415. Hereinafter, a flow rate represented by a flow rate signal input from the flow rate detection circuit 601 to the microcomputer 415 is referred to as "pre-correction flow rate FAin". The microcomputer 415 receives a certain voltage which is an output value of the temperature sensor 453, and converts the voltage into a temperature according to a predetermined characteristic. Hereinafter, the temperature obtained by the conversion is referred to as "pre-correction temperature TAin".

The microcomputer 415 includes a CPU which is a central processing unit, a read-only memory (ROM) which is a read-only nonvolatile storage area, and a random access memory (RAM) which is a readable/writable storage area. The CPU of the microcomputer 415 exerts a function to be described below by loading a program stored in the ROM into the RAM and executing the program. The pre-correction flow rate FAin and the pre-correction temperature TAin are input to the microcomputer 415. The microcomputer 415 performs processing to be described below, and outputs a post-correction flow rate FAout and a post-correction temperature TAout to the control device 200. The physical quantity detecting device 300 and the control device 200 are connected by a communication cable, and communication using a digital signal is performed according to a communication standard such as SENT, LIN (registered trademark), or CAN (registered trademark). The post-correction flow rate FAout and the post-correction temperature TAout output from the microcomputer 415 are used by the control device 200 for various engine operation controls.

4. Correction Method of Physical Quantity Detecting Device 300

4.1 Correction Method of Physical Quantity Detecting Device 300

Figure 4:
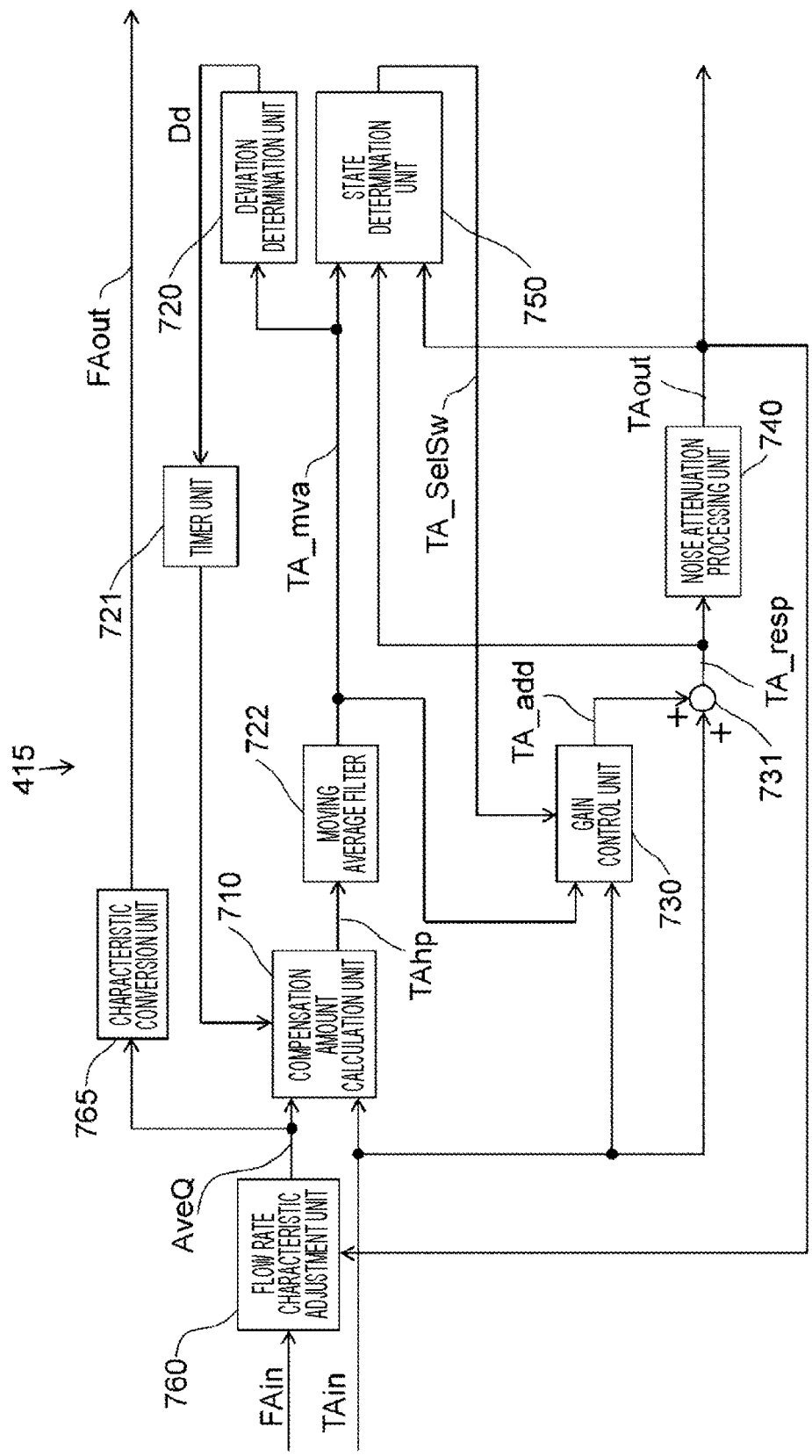
FIG. 4 is a functional block diagram of a microcomputer 415 according to an embodiment.

FIG. 4 is a functional block diagram illustrating each function of the microcomputer 415 as a block. The pre-correction flow rate FAin and the pre-correction temperature TAin are input to the microcomputer 415, and the microcomputer 415 outputs the post-correction flow rate FAout and the post-correction temperature TAout. Note that the processing performed by the microcomputer 415 also includes conversion processing that matches a predetermined characteristic, but here, characteristic conversion is also referred to as "correction" to unify expressions. The microcomputer 415 performs processing at each predetermined processing period.

The microcomputer 415 includes, as functions thereof, a flow rate characteristic adjustment unit 760, a compensation amount calculation unit 710, a deviation determination unit 720, a timer unit 721, a moving average filter 722, a gain control unit 730, an addition processing unit 731, a noise attenuation processing unit 740 that is a low-pass filter (hereinafter, referred to as "LPF"), and a state determination unit 750. Note that the functions of the microcomputer 415 may be realized by using the LSI 414, or may be realized by using a hardware circuit.

Overview of Each Functional Block

The flow rate characteristic adjustment unit 760 converts the pre-correction flow rate FAin, which is the output value of the flow rate detection circuit 601, according to a predetermined characteristic, and outputs it as AveQ. However, the characteristic is affected by the post-correction flow rate FAout to be described below. The flow rate characteristic adjustment unit 760 converts, for example, a non-linear output value of the flow rate detection circuit 601 into a linear value suitable for calculation processing. The compensation amount calculation unit 710 calculates a compensation amount for increasing a thermal response speed of the post-correction temperature TAout, which is the output of the microcomputer 415, by using the output value AveQ of the flow rate characteristic adjustment unit 760 and the pre-correction temperature TAin, and outputs the compensation amount as TAhp. However, the compensation amount calculation unit 710 sets the output TAhp to zero while a stop command is output from the timer unit 721.

The characteristic conversion unit 765 converts the characteristic in accordance with the characteristic of the control device 200 that uses the output of the physical quantity detecting device 300, and outputs the converted characteristic as the post-correction flow rate FAout. That is, the characteristic conversion unit 765 converts the characteristic of the output AveQ of the flow rate characteristic adjustment unit 760 to obtain the post-correction flow rate FAout.

TA_mva, which is an output of the moving average filter 722, is input to the deviation determination unit 720, a deviation is determined based on a time-series change of the input value, and a determination result is output as Dd to the timer unit 721. The timer unit 721 outputs the stop command to the compensation amount calculation unit 710 for a predetermined time according to the determination result Dd of the deviation determination unit 720. The moving average filter 722 applies the moving average filter to the output TAhp of the compensation amount calculation unit 710, and outputs, as TA_mva, the output of the noise-reduced compensation amount calculation unit 710 to the gain control unit 730, the deviation determination unit 720, and the state determination unit 750.

The gain control unit 730 determines a gain of the compensation amount calculated by the compensation amount calculation unit 710 based on a response state of the physical quantity detecting device 300. Then, the gain control unit 730 calculates TAadd by multiplying the determined gain and the output TA_mva of the moving average filter 722, and outputs TAadd to the addition processing unit 731. The addition processing unit 731 calculates TA_resp by adding the output TAadd of the gain control unit 730 and the pre-correction temperature TAin, and outputs TA_resp to the noise attenuation processing unit 740 and the state determination unit 750. The noise attenuation processing unit 740 applies a low-pass filter to reduce noise included in the output TA_resp of the addition processing unit 731, and outputs a result thereof as the post-correction temperature TAout.

The state determination unit 750 determines the response state of the physical quantity detecting device 300 based on the output value TA_mva of the moving average filter 722, the output value TA_resp of the addition processing unit 731, and the post-correction temperature TAout which is the output value of the noise attenuation processing unit 740. The response state of the physical quantity detecting device 300 is a state of response of the temperature sensor 453 of the physical quantity detecting device 300 to heat from the outside. That is, the determination of the response state of the physical quantity detecting device 300 is determination of whether the temperature sensor 453 is in a state of changing the output, that is, a response state, or in a steady state in which the output is constant. The state determination unit 750 selects a filter based on a determination result as described later, and outputs a signal indicating the selected filter as TA_SelSw to the gain control unit 730.

Influence of Heat

Since the temperature sensor 453 is installed in the physical quantity detecting device 300, a thermal response characteristic of the pre-correction temperature TA obtained by converting the output of the temperature sensor 453 is affected by a thermal capacity of the physical quantity detecting device 300. A thermal time constant of the housing 302 of the physical quantity detecting device 300 is several tens of times larger than a thermal time constant of the temperature detection portion 451. The heat of the housing 302 makes the temperature of the entire circuit board 400 uniform through a conductor wiring having a very high thermal conductivity.

Therefore, in the temperature detection portion 451, in addition to heat transfer from the intake air that is the measurement target fluid 30, thermal conduction occurs through the housing 302 and the circuit board 400, and thus thermal responsiveness of the pre-correction temperature TA deteriorates. In particular, the influence of heat conduction becomes relatively large in a low flow rate region where the influence of heat transfer from the intake air decreases, and a response delay of the pre-correction temperature TA is increased. Therefore, in the compensation amount calculation unit 710, the thermal response characteristic of the post-correction temperature TAout is improved by using phase lead compensation using a high-pass filter (hereinafter, referred to as "HPF").

Flow Rate Characteristic Adjustment Unit 760

Figure 18:
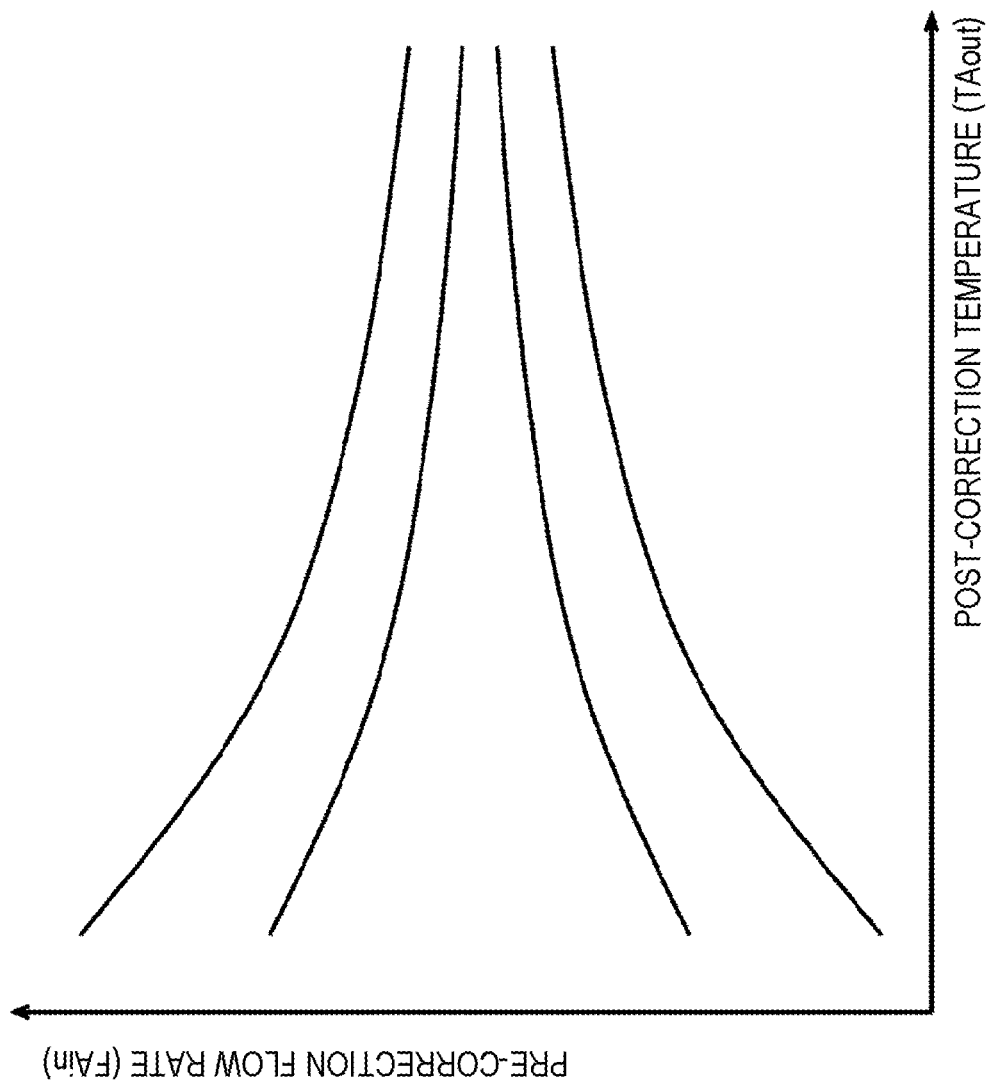
FIG. 18 is a diagram illustrating a characteristic of a flow rate characteristic adjustment unit 760.

FIG. 18 is a diagram illustrating a characteristic of the flow rate characteristic adjustment unit 760. The flow rate characteristic adjustment unit 760 outputs AveQ based on the pre-correction flow rate FAin and the post-correction temperature TAout. That is, a relationship between the pre-correction flow rate FAin, the post-correction temperature TAout, and AveQ can be expressed by a three-dimensional graph in which the pre-correction flow rate FAin is on an X axis, the post-correction temperature TAout is on a Y axis, and AveQ is on a Z axis. However, in FIG. 18, the relationship is two-dimensionally expressed for convenience of drawing.

Since the flow rate detection circuit 601 detects the flow rate using the heating element, the pre-correction flow rate FAin is affected by the temperature. Therefore, a relationship between the flow rate and the temperature is stored in advance, and AveQ is output according to the pre-correction flow rate FAin and the post-correction temperature TAout. As described above, a temperature characteristic of the pre-correction flow rate FAin varies depending on the flow rate. Note that although a graph is illustrated in FIG. 18, a mathematical expression or a plurality of tables may be used instead of the graph.

Compensation Amount Calculation Unit 710

Figure 5:
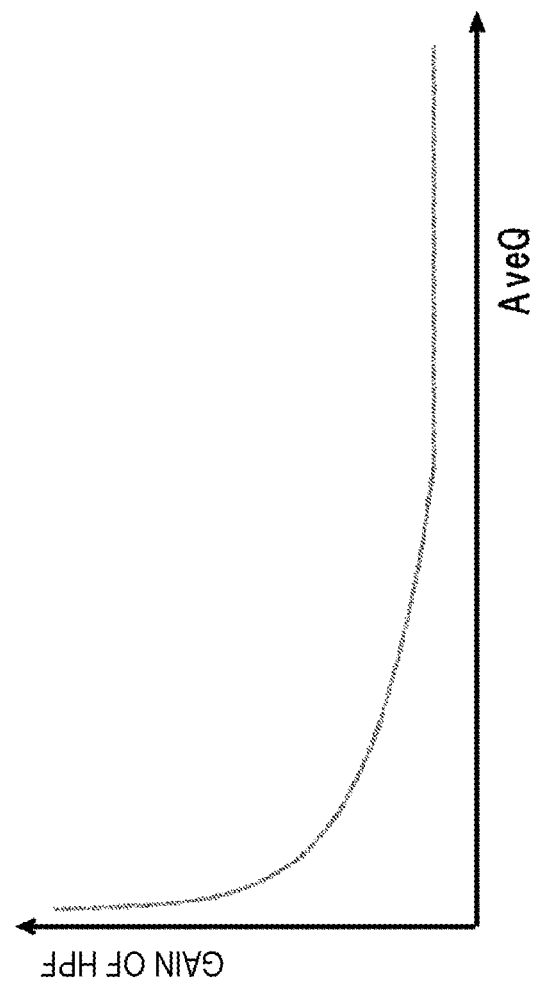
FIG. 5 is a diagram illustrating an example of a gain characteristic of a compensation amount calculation unit 710.

FIG. 5 is a diagram illustrating a gain characteristic of the HPF in the compensation amount calculation unit 710. As illustrated in FIG. 5, the gain of the HPF tends to decrease as the output value AveQ of the flow rate characteristic adjustment unit 760 increases. By determining the gain of the HPF in this way, it is possible to realize response compensation according to a time constant. Note that since the pre-correction flow rate FAin is corrected to AveQ linearized by the flow rate characteristic adjustment unit 760, setting of the gain according to the flow rate can be simplified.

Further, in a case of considering an influence of self-heat-generation of the circuit board 400, heat generation from the internal combustion engine, or the like, a time constant in the output of the temperature sensor 453 may be different between thermal response on a heating side and thermal response on a cooling side even when the measurement target fluid 30 changes in a similar manner. In other words, the time constant of the pre-correction temperature TAin may be different between a case where the pre-correction temperature TAin increases and a case where the pre-correction temperature TAin decreases. In order to deal with such a case, the gain of the HPF of the compensation amount calculation unit 710 may be switched between heating and cooling. Specifically, in a case of heating, that is, in a case where the pre-correction temperature TAin increases in a time series manner, the gain is increased, and in a case of cooling, that is, in a case where the pre-correction temperature TAin decreases in a time series manner, the gain is decreased. However, the magnitude of the gain may be set reversely.

FIGS. 6-1 and 6-2 are diagrams illustrating a relationship between the pre-correction temperature TAin and the post-correction temperature TAout. FIG. 6-1 is a diagram illustrating an example of a time-series change of the output of the temperature sensor 453 during thermal response of intake air, and FIG. 6-2 is a diagram illustrating an example of a time-series change of the temperature sensor when the output of the temperature sensor 453 suddenly changes due to an external disturbance. The difference between FIG. 6-1 and FIG. 6-2 is a change rate of the pre-correction temperature TAin. In FIG. 6-1, the change of the pre-correction temperature TAin is relatively gradual, and a time constant thereof is several seconds to several tens of seconds. In FIG. 6-2, the change of the pre-correction temperature TAin is rapid, and a time constant thereof is several seconds.

Generally, it is unlikely that the temperature of a measurement target gas changes rapidly, and it is usually considered that a time constant $\tau$ of the temperature change is several seconds to several tens of seconds. On the other hand, the pre-correction temperature TAin may change rapidly in a short time when in a water cooling environment condition or when an external disturbance such as EMC noise occurs. The compensation amount calculation unit 710 designs the high-pass filter under the assumption that the temperature change of the measurement target is gradual, that is, the time constant τ is several seconds to several tens of seconds, and thus a favorable response as illustrated in FIG. 6-1 can be obtained for an expected input. However, when the pre-correction temperature TAin suddenly changes due to an external disturbance, in a case where the state determination unit 750 or the gain control unit 730 is not provided, overshoot caused by overcorrection occurs in the post-correction temperature TAout as illustrated in FIG. 6-2. Therefore, the deviation determination unit 720 to be described below is provided.

Deviation Determination Unit 720

The deviation determination unit 720 calculates a deviation that is a difference between an output value of the compensation amount calculation unit 710 at a time t and an output value of the compensation amount calculation unit 710 at a time t-1, thereby classifying a temperature change due to intake air and a rapid temperature change due to an external disturbance.

Here, as a threshold value, a maximum deviation that can result from the temperature change due to intake air is used. Specifically, a threshold value TA_diff is a difference between a maximum temperature and a minimum temperature at which the physical quantity detecting device 300 can be operated according to a specification. In a case where a relationship shown in Expression 1 is satisfied, that is, in a case where it is determined that an absolute value of a deviation DT exceeds the threshold value TA_diff, deviation determination Dd is True, and it is determined that the output change due to an external disturbance occurred in the temperature sensor 453.

$$DT=|TA\_mva(t)-TA\_mva(t-1)|\ DT \geq TA\_diff \quad \text{(Expression 1)}$$

where TA_mva(t) is an output value of the moving average filter 722 at the time t.

When the output Dd of the deviation determination unit 720 is True, the timer unit 721 outputs the stop command to the compensation amount calculation unit 710 for a predetermined time. As a result, the output of the compensation amount calculation unit 710 becomes zero, and occurrence of overcorrection is suppressed.

Further, by providing the moving average filter 722 at the subsequent stage of the compensation amount calculation unit 710, noise of the deviation value is reduced, such that it is possible to prevent occurrence of erroneous determination due to the noise, and improve stability of the deviation determination.

Need for Further Improvement

FIG. 6-3 is a diagram illustrating a problem of the compensation amount calculation unit 710 in a case where the temperature of the measurement target fluid 30 changes gradually and continuously. In a case where the temperature of the measurement target fluid 30 changes gradually and continuously, for example, in a case where the time constant is in the order of several hundreds of seconds and the gain control unit 730 is not provided, for the post-correction temperature TAout, lead compensation is applied to an input value, which results in overcorrection.

FIG. 6-4 is a diagram illustrating a problem of an output shift in the compensation amount calculation unit 710. In addition to the compensation amount calculation unit 710, when a filter such as a high-pass filter is used, an output shift due to an influence of a calculation error may occur in a steady state where there is little change in intake air temperature, not during thermal response. When the output shift occurs, the output shifts by a predetermined amount as illustrated in FIG. 6-4, in other words, the output is biased.

In order to solve the problem of the compensation amount calculation unit 710 illustrated in FIGS. 6-3 and FIG. 6-4, a situation where the output of the compensation amount calculation unit 710 is used without changing is limited as follows. That is, the situation is limited to the rapid temperature change (time constant τ: the order of several to several tens of seconds) due to intake air in which the temperature changes in a step-response manner as illustrated in FIG. 6-1. In other temperature output change states, a gain of the lead compensation by the HPF is decreased or the lead compensation operation by the HPF is stopped. The state determination unit 750 is provided to realize this.

State Determination Unit 750

The state determination unit 750 performs determination based on the output values of the moving average filter 722, the addition processing unit 731, and the noise attenuation processing unit 740, and classifies the temperature change state due to the intake air to which the above-described HPF is to be applied and other temperature change states.

Figure 7:
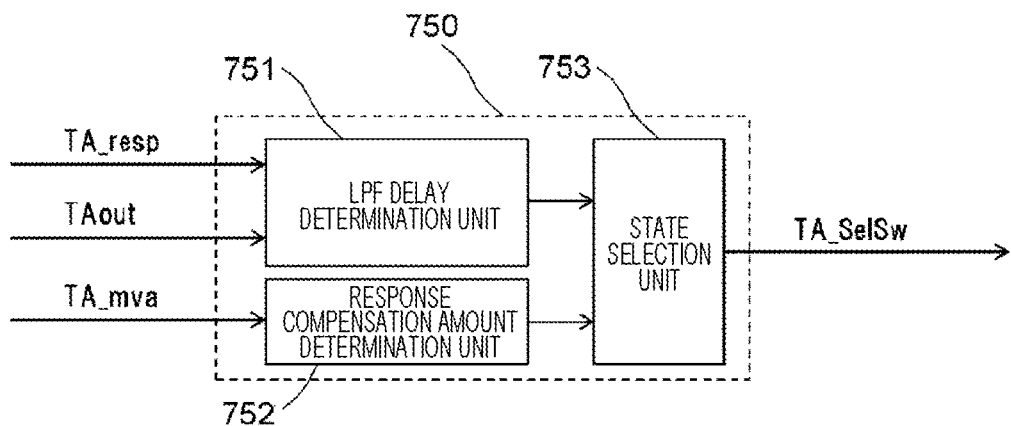
FIG. 7 is a functional configuration diagram of a state determination unit 750.

FIG. 7 is a functional configuration diagram of the state determination unit 750. The state determination unit 750 includes an LPF delay determination unit 751, a response compensation amount determination unit 752, and a state selection unit 753. The LPF delay determination unit 751 determines whether or not TAresp and the post-correction temperature TAout satisfy the condition of Expression 2 below. True is output when it is determined that the condition of Expression 2 is satisfied, and False is output when it is determined that the condition is not satisfied. Since the output values before and after passing the LPF at the time t are not calculated at the time of performing LPF delay determination at the time t, the output values before and after passing the LPF at the time t-1, which is the immediately preceding processing period, are buffered and used for determination. Further, in Expression 2, TA delay is a predetermined threshold value.

$$|TA\_resp(t-1)-TAout(t-1)| \geq TA\_delay \quad \text{(Expression 2)}$$

Figures 1, 8:
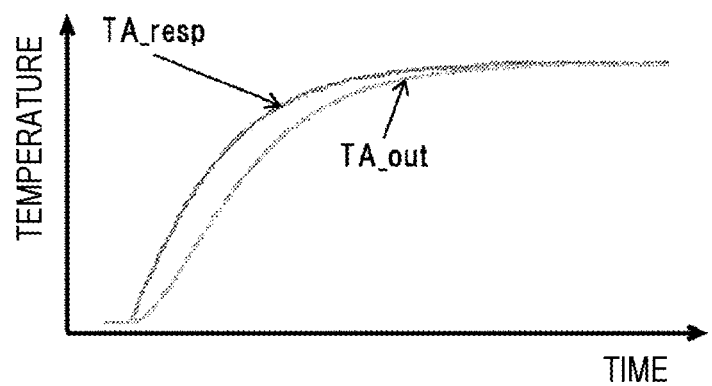
Figures 2, 8:
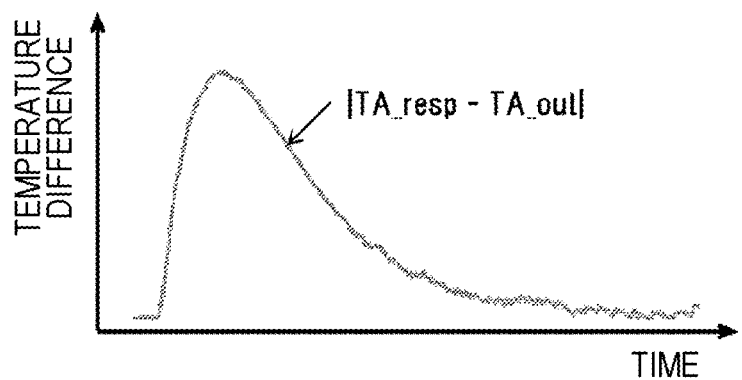

FIG. 8-1 is a diagram illustrating an input and an output of the LPF delay determination unit 751 at the start of thermal response. FIG. 8-2 is a diagram illustrating a difference between the input and the output in FIG. 8-1. Note that, in FIGS. 8-1 and 8-2, the scale of the vertical axis is different, but the scale of the horizontal axis is the same. When the thermal response starts, TA_resp before the low-pass filter is applied changes earlier than the post-correction temperature TAout after the low-pass filter is applied as illustrated in FIG. 8-1. Then, as illustrated in FIG. 8-2, a difference between TA_resp and the post-correction temperature TAout increases sharply and then gradually decreases. The description will be continued by referring back to FIG. 7.

The response compensation amount determination unit 752 detects thermal response by using a property that the lead compensation by the HPF is applied due to the temperature change and a response correction amount increases during the thermal response.

When an output of the response compensation amount determination unit 752 itself is True, the response compensation amount determination unit 752 determines whether or not the condition of Expression 3 is satisfied, and when the output of the response compensation amount determination unit 752 itself is False, the response compensation amount determination unit 752 determines whether or not the condition of Expression 4 is satisfied.

$$|TA\_mva| \geq TA\_mva\_Hys - TA\_mva\_\text{Offset} \quad \text{(Expression 3)}$$

$$|TA\_mva| \geq TA\_mva\_Hys \quad \text{(Expression 4)}$$

Note that, in Expressions 3 and 4, TA_mva_Hys is a response compensation amount threshold value and TA_mva_Offset is a response compensation amount threshold value offset.

Both are predetermined constants. As a method of determining these constants, for example, the response compensation amount threshold value can be a maximum deviation that can result from ramp response, and the response compensation amount threshold value offset can be determined based on an assumed noise level. The response compensation amount determination unit 752 refers to Expression 3 or Expression 4, outputs True when it is determined that an inequality relationship described in each expression is satisfied, and outputs False when it is determined that the inequality relationship described in each expression is not satisfied.

Expressions 3 and 4 will be described. In certain HPF constant setting in the compensation amount calculation unit 710, the response compensation amount may change due to a slight change in output of the temperature sensor 453 that is caused by an influence of a calculation error, and the response compensation amount may exceed the threshold value in a short time. In order to avoid such a problem, the threshold value of the response compensation amount has a hysteresis characteristic. Specifically, Expression 3 including the offset or Expression 4 that does not include the offset is used depending on the output of the LPF delay determination unit 751. The threshold values shown in Expressions 3 and 4 can be said to be "threshold values having hysteresis characteristic" or "hysteresis threshold values".

Figure 9:
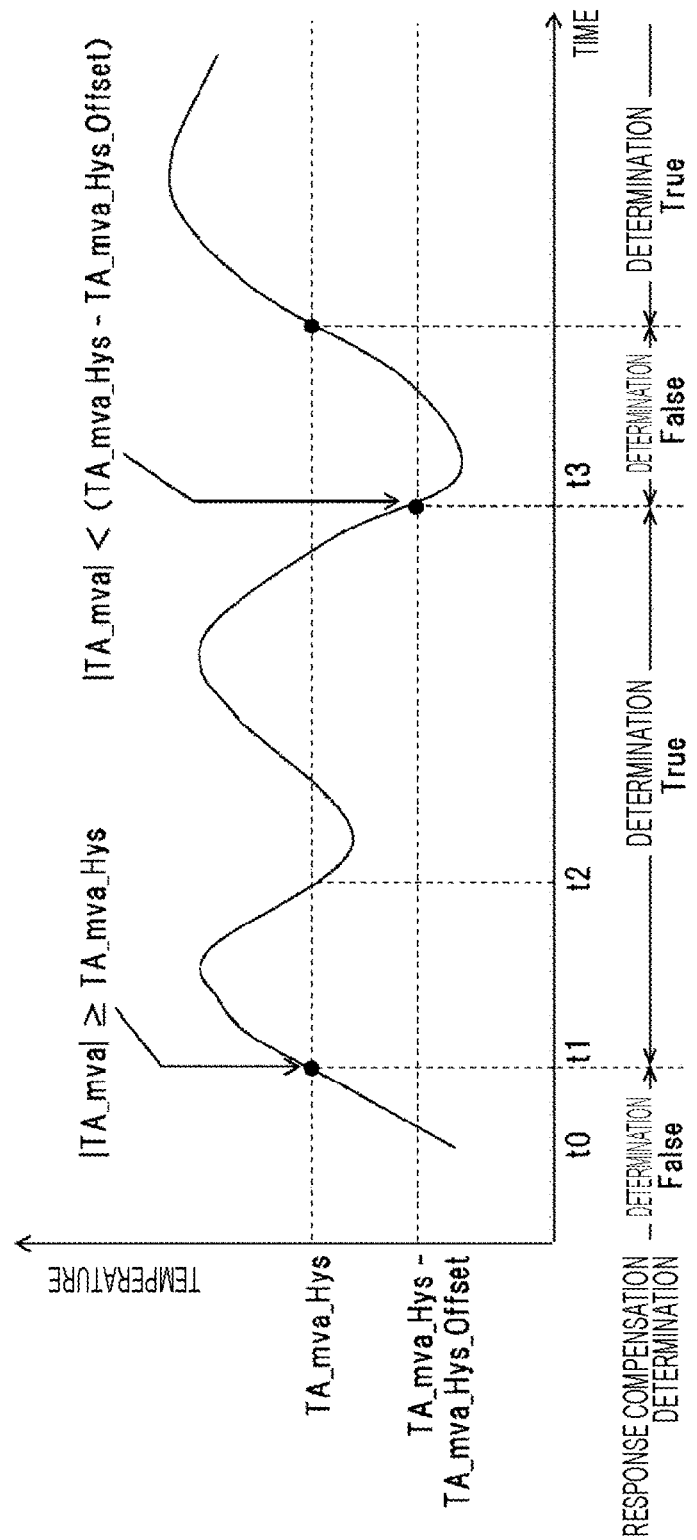
FIG. 9 is a diagram illustrating an output of a response compensation amount determination unit 752.

FIG. 9 is a diagram illustrating an output of the response compensation amount determination unit 752. In FIG. 9, a horizontal axis represents the passage of time, and a vertical axis represents a value of TA_mva which is the input value of the response compensation amount determination unit 752. At a time t0 shown on the left side of FIG. 9, the output of the response compensation amount determination unit 752 was False. Then, TA_mva increased, and at a time t1, TA_mva became TA_mva_Hys or more. Since the output of the response compensation amount determination unit 752 is False immediately before the time t1, the response compensation amount determination unit 752 performs determination using Expression 4 that does not include TA_mva_Offset. At the time t1, the response compensation amount determination unit 752 determines that the inequality relationship in Expression 4 is satisfied, and thus outputs True, and thereafter, the response compensation amount determination unit performs determination using Expression 3 including TA_mva_Offset. Therefore, at a time t2, TA_mva has the same value as that at the time t1, but the output of True is maintained and the output is changed to False at a time t3. By using Expression 3 and Expression 4 properly in this way, the hysteresis characteristic is provided.

The LPF delay determination unit 751 described above can detect a response start timing, but it is difficult to continue the detection until the response ends. In addition, the response compensation amount determination unit 752 performs the detection even at the time of a gradual temperature change in a ramp-response manner due to intake air. Therefore, the state selection unit 753 is further provided, and determination results of the LPF delay determination unit 751 and the response compensation amount determination unit 752 are combined to classify the above-described state to which the HPF should be applied and other states.

FIG. 10 is a diagram illustrating state selection performed by the state selection unit 753. The state selection unit 753 selects a state according to the outputs of the LPF delay determination unit 751 and the response compensation amount determination unit 752. Since the LPF delay determination unit 751 and the response compensation amount determination unit 752 each output True or False, there are four combinations in total. Here, the four combinations are referred to as Cases 1 to 4.

The state selection unit 753 selects a response state (TA_SelSw=1) in Case 1 in which the outputs of the LPF delay determination unit 751 and the response compensation amount determination unit 752 are both True. The state selection unit 753 keeps a selected state in the preceding processing period in Cases 2 and 3 in which the outputs of the LPF delay determination unit 751 and the response compensation amount determination unit 752 do not coincide each other, that is, one of the outputs is True and the other is False. The state selection unit 753 selects a steady state (TA_SelSw=0) in Case 4 in which the outputs of the LPF delay determination unit 751 and the response compensation amount determination unit 752 are both False.

The HPF can be used for the response state, and a state in which the gain of the lead compensation by the HPF is decreased or a state in which the lead compensation operation by the HPF is stopped and no filtering processing is performed can be used for the steady state. Since the state selection unit 753 switches the filter only when the determination results of the LPF delay determination unit 751 and the response compensation amount determination unit 752 coincide each other, it is possible to prevent frequent state switching when the determination results of the LPF delay determination unit 751 and the response compensation amount determination unit 752 are changed in the vicinity of the threshold value, thereby improving stability in state determination.

Gain Control Unit 730

Figure 11:
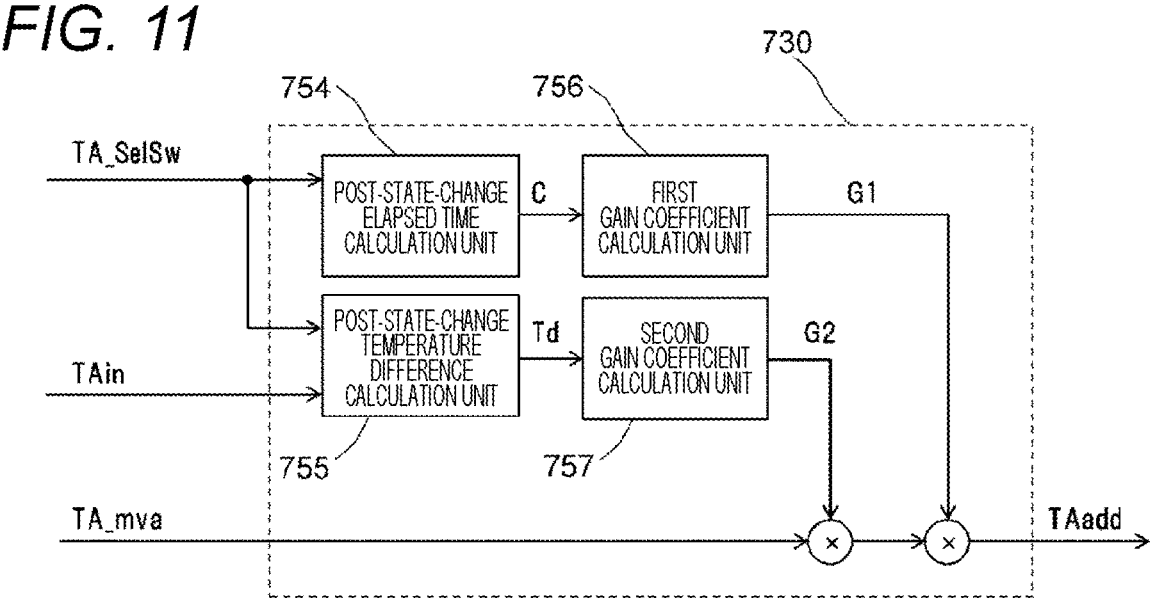
FIG. 11 is a functional block diagram of a gain control unit 730.

FIG. 11 is a functional block diagram illustrating a plurality of functions of the gain control unit 730 as blocks. The gain control unit 730 includes a post-state-change elapsed time calculation unit 754, a post-state-change temperature difference calculation unit 755, a first gain coefficient calculation unit 756, and a second gain coefficient calculation unit 757. The gain control unit 730 multiplies TA_mva, which is the output value of the moving average filter 722, by a first gain G1 and a second gain G2 and outputs a product thereof as TAadd. Details of the gain control unit 730 will be described below.

TA_SelSw, which is the output of the state determination unit 750, is input to the post-state-change elapsed time calculation unit 754, and the post-state-change elapsed time calculation unit 754 outputs an elapsed time to the first gain coefficient calculation unit 756. More specifically, the post-state-change elapsed time calculation unit 754 holds a count C as an internal variable, and outputs a value of the count C as information indicating the elapsed time. The post-state-change elapsed time calculation unit 754 counts up time each time the processing period elapses, and resets the count C to zero when TA_SelSw changes. In other words, when the value of TA_SelSw at the time t is represented as TA_SelSw(t), the post-state-change elapsed time calculation unit 754 resets the count C when Expression 5 is satisfied.

$$TA\_SelSw(t-1) != TA\_SelSw(t) \quad \text{(Expression 5)}$$

The first gain coefficient calculation unit 756 determines a gain coefficient based on the value of the count C output by the post-state-change elapsed time calculation unit 754, and outputs the gain coefficient as the first gain G1. The first gain coefficient calculation unit 756 applies the HPF only for a time corresponding to the time constant of the thermal response, and decreases the gain coefficient or stops the HPF, that is, sets the gain coefficient to zero, at other times. Overcorrection can be suppressed by the first gain G1, and reliability of response compensation processing can be improved.

Figures 1, 12:
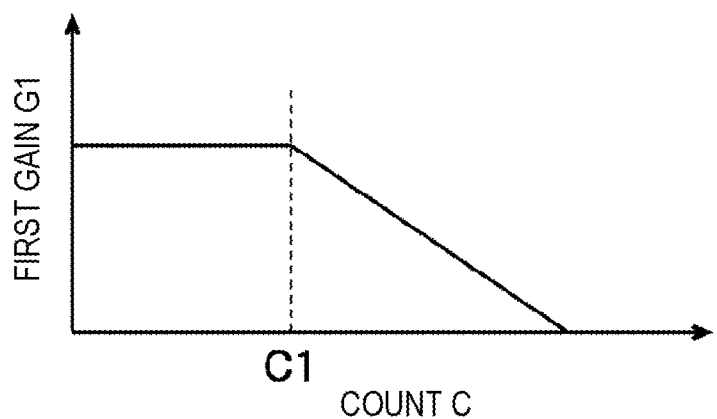
Figures 2, 12:
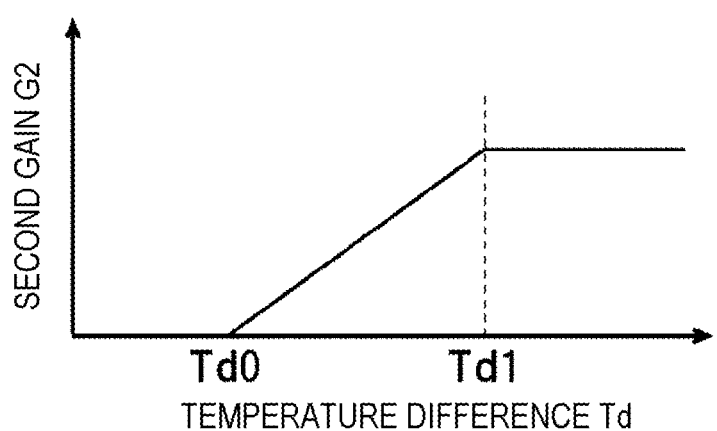

FIG. 12-1 is a diagram illustrating an example of an input/output relationship of the first gain coefficient calculation unit 756. In FIG. 12-1, a horizontal axis represents the count C, that is, time, and a vertical axis represents the first gain G1. The first gain G1 has a predetermined value when the count C is 0 to C1, and when the count C exceeds C1, the first gain G1 linearly decreases and becomes zero.

The count C1 is, for example, the number of processing periods that corresponds to an assumed time constant of temperature change. For example, when the processing period is 0.1 seconds and the assumed time constant of temperature change is 10 seconds, C1 is 100.

TA_SelSw, which is the output of the state determination unit 750, and the pre-correction temperature TAin are input to the post-state-change temperature difference calculation unit 755. The post-state-change temperature difference calculation unit 755 outputs the changed temperature after the state change to the second gain coefficient calculation unit 757. More specifically, the post-state-change temperature difference calculation unit 755 holds a temperature Ts at the time of the state change as an internal variable, and records the pre-correction temperature TAin as the state-change temperature Ts each time the relationship of Expression 4 described above is satisfied. Note that when the temperature Ts at the time of the state change is generalized, it can be called a "signal at the time of the state change". The temperature Ts at the time of the state change is stored in a temporary storage unit, for example, the RAM of the microcomputer 415. The post-state-change temperature difference calculation unit 755 outputs, as a temperature difference Id, a difference between the temperature Ts at the time of the state change and the pre-correction temperature TAin to the second gain coefficient calculation unit 757.

The second gain coefficient calculation unit 757 determines a gain coefficient based on a value of the temperature difference Td output by the post-state-change temperature difference calculation unit 755, and outputs the gain coefficient as the second gain G2. The second gain coefficient calculation unit 757 applies the HPF only to a temperature difference area that can occur due to the thermal response of the intake air temperature, and sets the gain coefficient to zero for other temperature differences. Overcorrection can be suppressed by the second gain G2, and reliability of response compensation processing can be improved.

FIG. 12-2 is a diagram illustrating an example of an input/output relationship of the second gain coefficient calculation unit 757. In FIG. 12-2, a horizontal axis represents the temperature difference Td, and a vertical axis represents the second gain G2. The second gain G2 monotonically increases when a temperature difference Td1 is from Td0 to Td1 and the second gain G2 becomes a constant value when the temperature difference exceeds Td1.

According to the above-described embodiment, the following actions and effects can be obtained.

(1) The physical quantity detecting device 300 includes: the temperature sensor 453 that detects a temperature of the measurement target fluid 30 and outputs a signal corresponding to the pre-correction temperature TAin; the compensation amount calculation unit 710 that calculates, by using the pre-correction temperature TAin, a lead compensation amount used in lead compensation for the pre-correction temperature TAin; and the gain control unit 730 that adjusts the lead compensation amount based on a deviation that is an amount of change in lead compensation amount over time. Therefore, overcorrection due to the lead compensation can be suppressed. The effects will be described in detail below.

Since the physical quantity detecting device 300 adjusts the lead compensation amount based on the deviation that is the change in compensation amount calculated by the compensation amount calculation unit 710 over time, it is possible to apply correction according to the response state of the temperature sensor 453, thereby improving responsiveness and preventing overcorrection at the same time. That is, under the condition where a response time is long, such as in air, the lead compensation is applied to increase the response speed. Then, under the condition of a water cooling environment in which a response time is short or the condition of a sudden signal change due to EMC noise, overcorrection can be suppressed by stopping the phase lead compensation, thereby improving accuracy in temperature measurement.

(2) In a case where the deviation is equal to or more than a predetermined value, the output Dd of the deviation determination unit 720 is True, and a stop command is received from the timer unit 721, thus the gain control unit 730 sets the lead compensation amount to zero. Therefore, overcorrection can be greatly suppressed by setting the compensation amount to zero in an overcorrection state where the deviation is large.

(3) The deviation that the deviation determination unit 720 evaluates is a value subjected to moving average processing by the moving average filter 722. Therefore, an influence of noise included in the pre-correction temperature TAin can be reduced.

(4) The gain control unit 730 includes the state determination unit 750 for determining the state of the temperature sensor 453 using the pre-correction temperature TAin and performing a gain control to adjust the lead compensation amount. Therefore, the correction is applied according to the state of the temperature sensor 453, and it is possible to improve the responsiveness and prevent overcorrection at the same time.

(5) The microcomputer 415 includes the noise attenuation processing unit 740 for reducing output noise of the post-correction temperature TAout. As illustrated in FIG. 10, the state selection unit 753 determines the state of the temperature sensor 453 based on a result of determination performed by the response compensation amount determination unit 752 using the amount of delay that occurs due to the noise attenuation processing unit 740, that is, the determination result of the LPF delay determination unit 751, and the lead compensation amount.

(6) The determination based on the lead compensation amount that is performed by the response compensation amount determination unit 752 is determination of a magnitude relationship between the compensation amount and the threshold value having the hysteresis characteristic as illustrated in FIG. 9. When the threshold value does not have the hysteresis characteristic and is a predetermined constant value, in certain HPF constant setting, the response compensation amount may change due to a slight change in output of the temperature sensor 453 that is caused by an influence of a calculation error, and the response compensation amount may exceed the threshold value in a short time. However, such a problem can be avoided because the threshold value has the hysteresis characteristic as shown in Expressions 3 and 4.

(7) The microcomputer 415 includes: the post-state-change elapsed time calculation unit 754 including the storage unit that stores, as a signal at the time of state change, the pre-correction temperature TAin that is a detection signal when the state of the temperature sensor 453 is changed; and the first gain coefficient calculation unit 756 that determines the first gain G1 used by the gain control unit 730 according to a difference between the latest pre-correction temperature TAin and the signal at the time of the state change. Therefore, the HPF can be applied only to a temperature difference area that can occur due to the thermal response of the intake air temperature, and the gain coefficient can be set to zero for other temperature differences, thereby suppressing overcorrection and improving the reliability of the response compensation processing.

(8) The microcomputer 415 includes the second gain coefficient calculation unit 757 that determines the second gain G2 used by the gain control unit 730 according to a time elapsed from a time when the state of the temperature sensor 453 is changed. Therefore, the HPF can be applied only for the time corresponding to the time constant of the thermal response, and at other times, the gain coefficient can be decreased or the gain coefficient can be set to zero, thereby suppressing overcorrection and improving the reliability of the response compensation processing.

(9) The compensation amount calculation unit 710 sets a different gain for each of a case where the pre-correction temperature TAin increases and a case where the pre-correction temperature TAin decreases. Therefore, it is possible to cope with a case where the time constant in the output of the temperature sensor 453 is different between thermal response on a heating side and thermal response on a cooling side.

(10) The physical quantity detecting device 300 includes the flow rate detection circuit 601 that detects the flow rate of the measurement target fluid 30. The compensation amount calculation unit 710 changes the gain of the HPF based on AveQ obtained by adjusting the flow rate characteristic of the pre-correction flow rate FAin, which is the output of the flow rate detection circuit 601 as illustrated in FIG. 5. For example, the influence of heat conduction becomes relatively large in a low flow rate region where the influence of heat transfer from the intake air decreases, and a response delay of the pre-correction temperature TA is increased. However, the response compensation according to the time constant can be realized by determining the gain according to the flow rate.

(11) The physical quantity detecting device 300 corrects the temperature characteristic of the flow rate detection circuit 601 using the temperature of the temperature sensor 453 corrected by a correction processing unit, that is, the post-correction temperature TAout. Therefore, the flow rate at the time of thermal response can be calculated with high accuracy.

(12) A physical quantity detecting sensor, the compensation amount calculation unit, and the gain control unit are mounted on the same board formed of a glass epoxy resin. In the board formed of the glass epoxy resin, the thermal response remarkably deteriorates, but the board formed of the glass epoxy resin is inexpensive and easy to process, which is advantageous.

Therefore, by using the microcomputer 415 having the configuration of the present embodiment or the like, even when the board formed of the glass epoxy resin is used, the problem of thermal response can be suppressed, and a manufacturing cost of the physical quantity detecting device 300 can be reduced.

Modified Example 1

Figure 13:
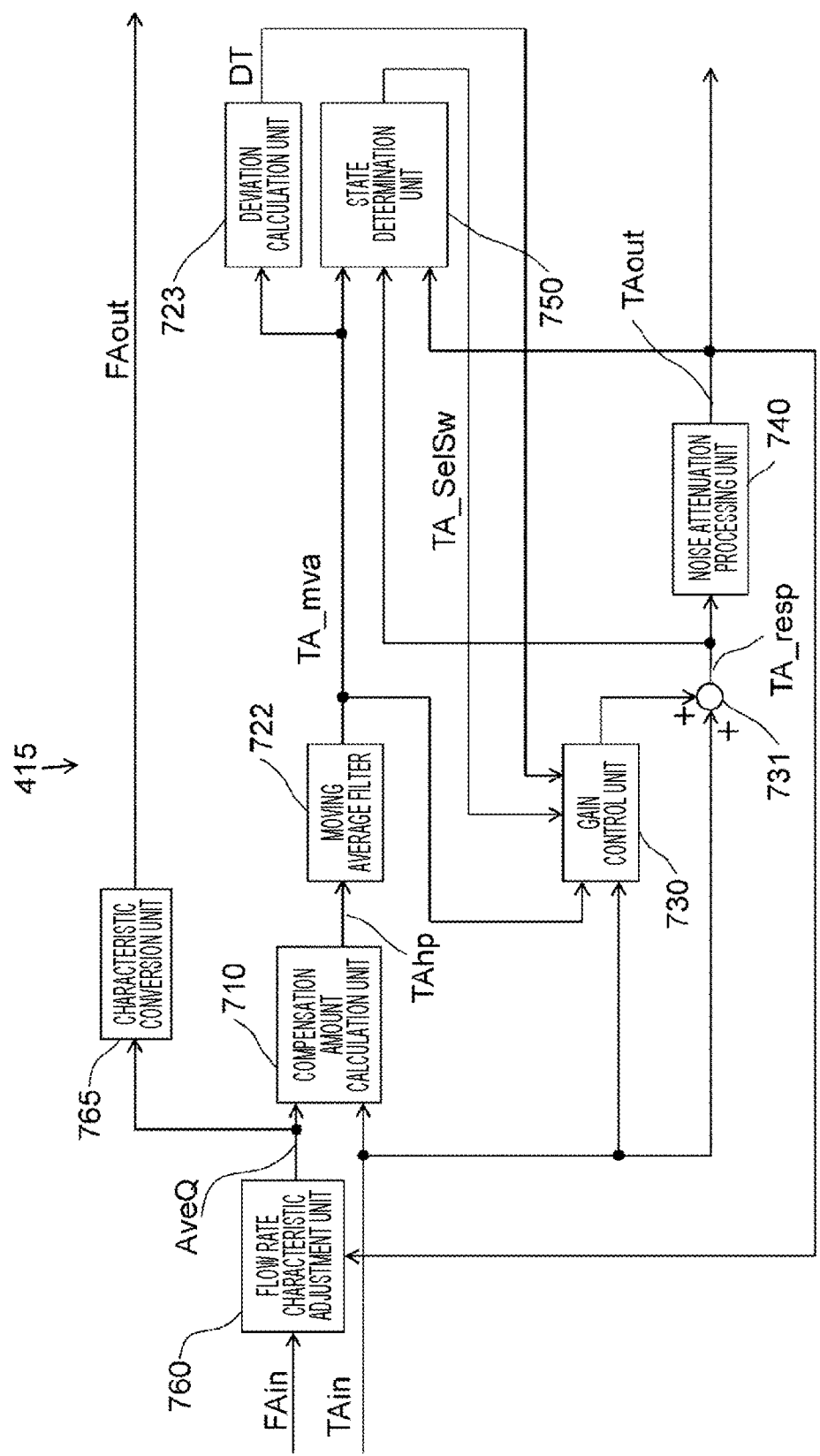
FIG. 13 is a functional block diagram of the microcomputer 415 in Modified Example 1.

The microcomputer 415 does not have to include the timer unit 721. FIG. 13 is a functional block diagram of the microcomputer 415 that does not include the timer unit 721. Further, in FIG. 13, a deviation calculation unit 723 is provided instead of the deviation determination unit 720. TA_mva, which is the output of the moving average filter 722, is input to the deviation calculation unit 723. The deviation calculation unit 723 calculates a deviation that is the amount of change in TA_mva which is the input value over time, and outputs the deviation as DT to a third gain coefficient calculation unit 758 to be described below.

In the present modified example, the output of the state determination unit 750 is input to the gain control unit 730.

Figure 14:
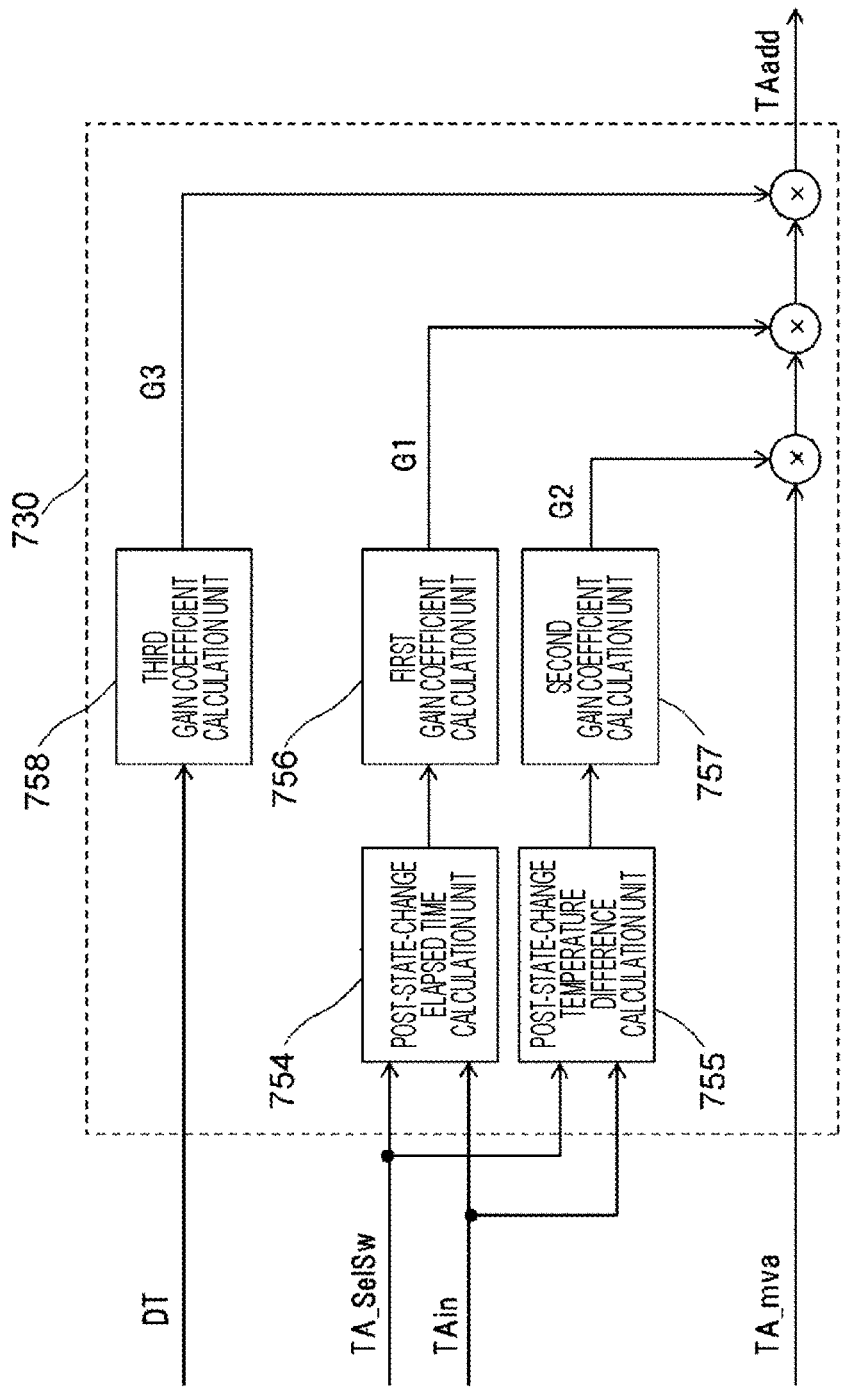
FIG. 14 is a functional block diagram of the gain control unit 730 in Modified Example 1.

FIG. 14 is a functional block diagram of the gain control unit 730 in Modified Example 1.

In the present modified example, the third gain coefficient calculation unit 758 is added to the configuration of the embodiment. The third gain coefficient calculation unit 758 determines and outputs a third gain G3 based on the deviation DT output from the deviation calculation unit 723. The third gain coefficient calculation unit 758 applies the HPF only to a deviation area that can occur due to the thermal response of the intake air temperature, and sets the gain coefficient to zero for other deviations. Overcorrection can be suppressed by the third gain G3, and reliability of response compensation processing can be improved.

Figure 15:
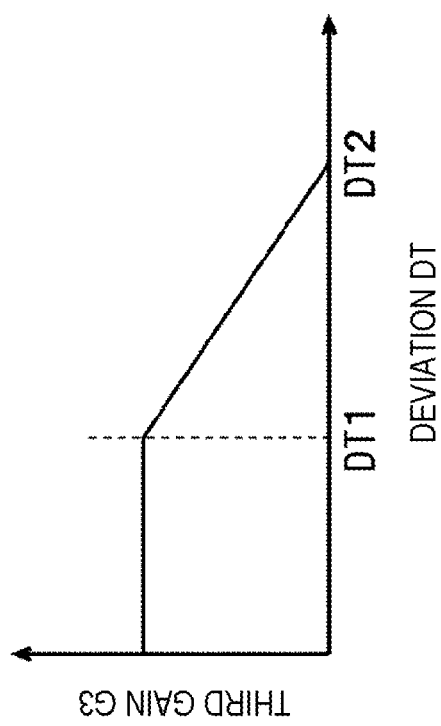
FIG. 15 is a diagram illustrating an example of an input/output relationship of a third gain coefficient calculation unit 758.

FIG. 15 is a diagram illustrating an example of an input/output relationship of the third gain coefficient calculation unit 758. In FIG. 15, a horizontal axis represents the deviation DT, and a vertical axis represents the third gain G3. The third gain G3 has a predetermined value when the deviation DT is 0 to DT1, linearly decreases when the deviation DT exceeds DT1, and becomes zero when the deviation DT exceeds DT2.

The gain control unit 730 multiplies TA_mva, which is the output value of the moving average filter 722, by the first gain G1, the second gain G2, and the third gain G3, and outputs a product thereof as TAadd. Therefore, when the output DT of the deviation calculation unit exceeds DT2, TAadd becomes zero because the third gain G3 is zero. As described above, even when the timer unit 721 is not provided, the same actions and effects as those of the embodiment can be obtained.

Modified Example 2

Figure 16:
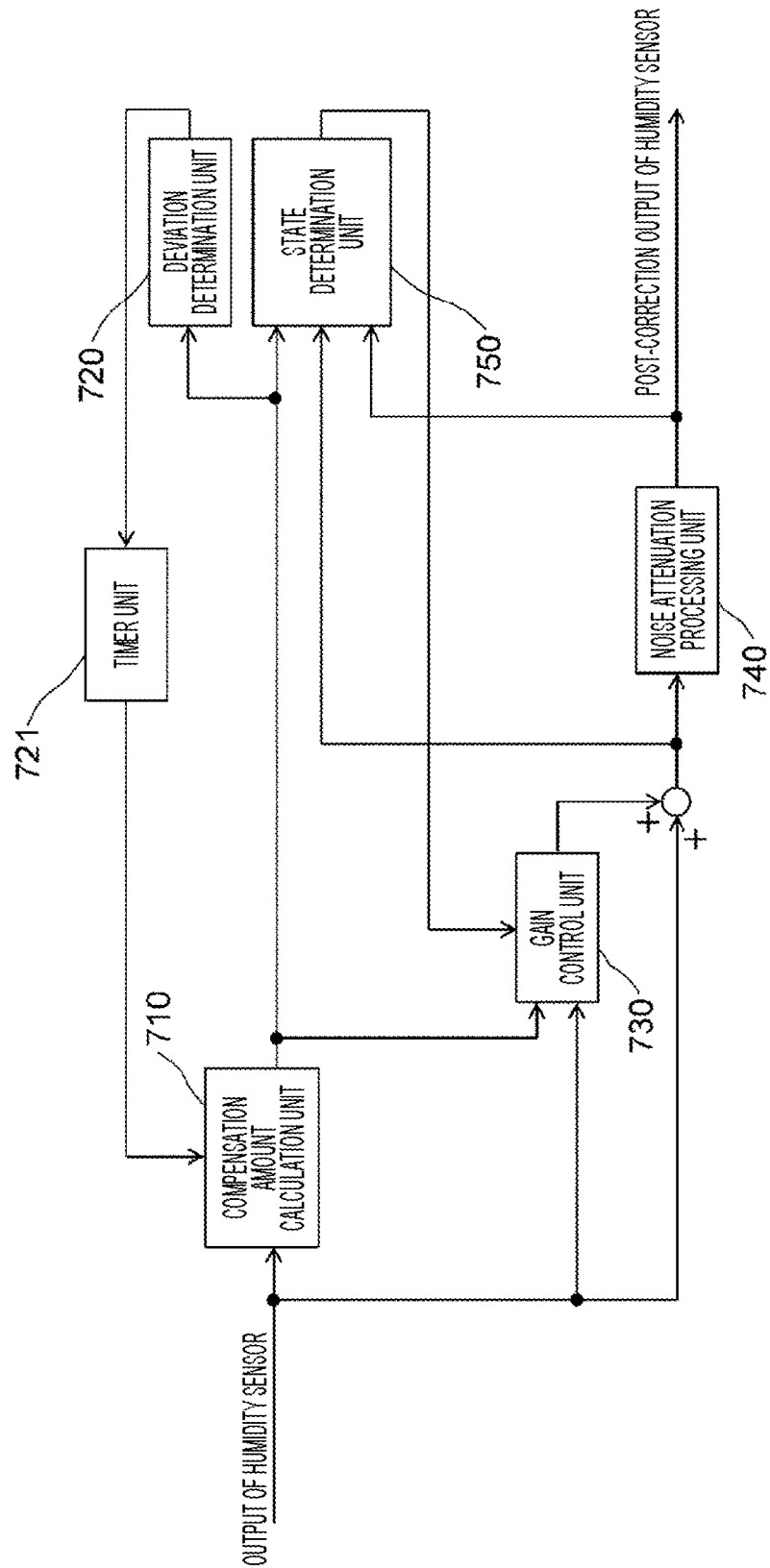
FIG. 16 is a functional block diagram of the microcomputer 415 in a case of correcting an output value of a humidity sensor in Modified Example 2.
Figure 17:
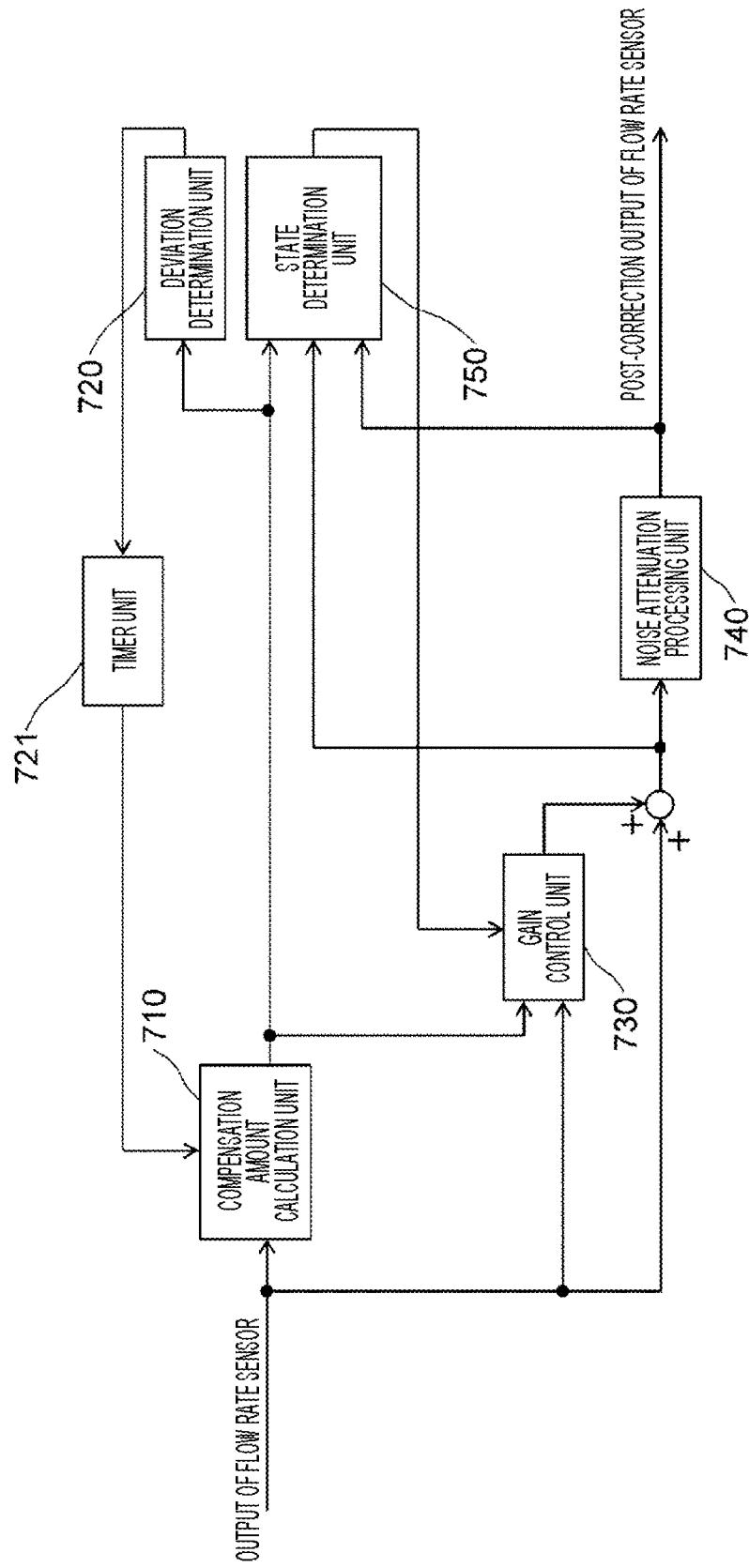
FIG. 17 is a functional block diagram of the microcomputer 415 in a case of correcting an output value of a flow rate sensor in Modified Example 2.

In the above-described embodiment, the correction target is the temperature, but various physical quantities can be the correction targets. FIG. 16 is a functional block diagram of the microcomputer 415 in a case of correcting an output value of a humidity sensor, and FIG. 17 is a functional block diagram of the microcomputer 415 in a case of correcting an output value of a flow rate sensor. However, in this case, the gain of the compensation amount calculation unit 710 is set to a certain constant value. Since the correction target in the embodiment is the temperature, the signal of the flow rate that affects the temperature is also used as illustrated in FIG. 4, but the signal of the flow rate is not necessarily required for correction of the humidity or flow rate, other measurement amounts are not described in FIG. 16 or 17.

That is, the present invention can be realized by using only a measurement value of a single physical quantity detecting element and a value calculated using the measurement value, and other physical quantity detecting elements are not essential. In other words, an additional sensor for correction is not essential, and thus the physical quantity detecting device can be downsized.

Modified Example 3

In the above-described embodiment, the compensation amount calculation unit 710 sets the output TAhp to zero when receiving the stop command from the timer unit 721. However, instead of setting the output TAhp to zero when receiving the stop command from the timer unit 721, the compensation amount calculation unit 710 may calculate the compensation amount with a decreased gain of the high-pass filter as compared with a usual one, and outputs the output TAhp that is not zero.

Modified Example 4

In the above-described embodiment, the deviation determination unit 720 and the timer unit 721 do not have to be provided. In this case, the output TAhp of the compensation amount calculation unit 710 does not become zero by the stop command from the timer unit 721, but similar effects of the embodiment can be obtained by the operations of the state determination unit 750 and the gain control unit 730.

Modified Example 5

The physical quantity detecting device 300 does not have to include the on-board temperature sensor 423 or the relative humidity sensor 422.

Although the embodiments of the present invention have been described in detail above, the present invention is not limited to the above-described embodiments, and various design changes can be made. For example, the above-described embodiments have been described in detail in order to describe the present invention in an easy-to-understand manner, and the present invention is not necessarily limited to those having all the configurations described. Moreover, a plurality of modified examples may be combined.

REFERENCE SIGNS LIST

30 measurement target fluid
300 physical quantity detecting device
400 circuit board
415 microcomputer
453 temperature sensor
601 flow rate detection circuit
710 compensation amount calculation unit
720 deviation determination unit
721 timer unit
722 moving average filter
723 deviation calculation unit
730 gain control unit
731 addition processing unit
740 noise attenuation processing unit
750 state determination unit
751 LPF delay determination unit
752 response compensation amount determination unit
753 state selection unit
754 post-state-change elapsed time calculation unit
755 post-state-change temperature difference calculation unit
756 first gain coefficient calculation unit
757 second gain coefficient calculation unit
758 third gain coefficient calculation unit
760 flow rate characteristic adjustment unit

The invention claimed is:

1. A physical quantity detecting device comprising:
a physical quantity detecting sensor configured to detect a physical quantity of a measurement target fluid and output a detection signal;
a compensation amount calculation circuit configured to calculate, by using the detection signal, a lead compensation amount used in lead compensation for the detection signal; and
a gain control circuit configured to adjust the lead compensation amount based on a deviation that is an amount of change in lead compensation amount over time,
wherein the physical quantity detecting sensor, the compensation amount calculation circuit, and the gain control circuit are mounted on the same board formed of a glass epoxy resin.

2. The physical quantity detecting device according to claim 1, wherein the gain control circuit is configured to set the lead compensation amount to zero when the deviation is equal to or more than a predetermined value.

3. The physical quantity detecting device according to claim 1, wherein the deviation uses a moving average of the lead compensation amount.

4. The physical quantity detecting device according to claim 1, wherein the gain control circuit is configured to adjust the lead compensation amount by using a result of determining a state of the physical quantity detecting sensor by using the detection signal.

5. The physical quantity detecting device according to claim 4, further comprising a noise attenuation processing circuit configured to reduce output noise of the physical quantity detecting sensor,
wherein the state of the physical quantity detecting sensor is determined based on an amount of delay that occurs due to the noise attenuation processing circuit, and the lead compensation amount.

6. The physical quantity detecting device according to claim 5, wherein the determination based on the lead compensation amount is determination of a magnitude relationship between the lead compensation amount and a threshold value having a hysteresis characteristic.

7. The physical quantity detecting device according to claim 5, further comprising:
a storage configured to store, as a signal at a time of state change, the detection signal when the state of the physical quantity detecting sensor is changed; and
a first gain coefficient calculation circuit configured to determine a first gain used by the gain control circuit according to a difference between a latest detection signal and the signal at the time of the state change.

8. The physical quantity detecting device according to claim 5, further comprising a second gain coefficient calculation circuit configured to determine a second gain used by the gain control circuit according to a time elapsed from a time when the state of the physical quantity detecting sensor is changed.

9. The physical quantity detecting device according to claim 1, wherein the compensation amount calculation circuit is configured to set a different gain for each of a case where the detection signal increases and a case where the detection signal decreases.

10. The physical quantity detecting device according to claim 1, further comprising a flow rate sensor configured to detect a flow rate of the measurement target fluid,
   wherein the physical quantity is a temperature, and the compensation amount calculation circuit is configured to change a gain used to calculate the lead compensation amount based on an output of the flow rate sensor.

11. The physical quantity detecting device according to claim 10, wherein a temperature characteristic of the flow rate sensor is corrected by using a temperature of the flow rate sensor corrected using the lead compensation amount adjusted by the gain control circuit.

\* \* \* \* \*